United States Patent
Sun et al.

(10) Patent No.: US 12,238,811 B2
(45) Date of Patent: Feb. 25, 2025

(54) COMMUNICATION METHOD AND APPARATUS

(71) Applicant: Huawei Technologies Co., Ltd., Shenzhen (CN)

(72) Inventors: Fei Sun, Shanghai (CN); Haiyan Luo, Shenzhen (CN); Mingzeng Dai, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 332 days.

(21) Appl. No.: 17/854,879

(22) Filed: Jun. 30, 2022

(65) Prior Publication Data

US 2022/0338300 A1  Oct. 20, 2022

Related U.S. Application Data

(63) Continuation of application No. PCT/CN2019/130985, filed on Dec. 31, 2019.

(51) Int. Cl.
*H04B 17/40* (2015.01)
*H04W 28/02* (2009.01)
(Continued)

(52) U.S. Cl.
CPC ....... *H04W 76/30* (2018.02); *H04W 28/0289* (2013.01); *H04W 48/18* (2013.01); *H04W 76/10* (2018.02); *H04W 84/042* (2013.01)

(58) Field of Classification Search
None
See application file for complete search history.

(56) References Cited

U.S. PATENT DOCUMENTS 10,484,886 B2   11/2019  Griot et al.
10,952,105 B2    3/2021  Jin et al.
(Continued)

FOREIGN PATENT DOCUMENTS

CN  108347736 A   7/2018
CN  109041138 A  12/2018
(Continued)

OTHER PUBLICATIONS

"Motivation on enhancement of Network Slicing," Source: KDDI, Agenda item: 8.1.14, Document for: Discussion, 3GPP TSG RAN Meeting #85, RP-192218, Newport Beach, USA, Sep. 16-20, 2019, 6 pages.
(Continued)

*Primary Examiner* — Sithu Ko
(74) *Attorney, Agent, or Firm* — SLATER MATSIL, LLP

(57) ABSTRACT

A communication method and apparatus, the method including obtaining, by a distributed unit (DU), resource occupation information of network slices that are in at least two public land mobile networks (PLMNs) supported by a cell of the DU, where the network slices in the at least two PLMNs share a resource, sending, by the DU, the resource occupation information to a centralized unit (CU), receiving, by the DU, request information from a terminal, where the request information comprises an identifier of a first PLMN and an identifier of a first network slice, and where the request information is used by the terminal to request to access the first network slice that is in the first PLMN, and sending, by the DU, the request information to the CU.

18 Claims, 14 Drawing Sheets

(51) Int. Cl.
   *H04W 48/18* (2009.01)
   *H04W 76/10* (2018.01)
   *H04W 76/30* (2018.01)
   *H04W 84/04* (2009.01)

(56) References Cited

U.S. PATENT DOCUMENTS

| | | | |
|---|---|---|---|
| 11,317,369 | B2 | 4/2022 | Chun |
| 11,343,755 | B2* | 5/2022 | Park .................... H04W 88/10 |
| 11,963,252 | B2* | 4/2024 | Kim .................... H04W 76/19 |
| 2018/0368205 | A1* | 12/2018 | Park .................... H04W 76/34 |
| 2019/0166526 | A1* | 5/2019 | Xu ...................... H04W 92/20 |
| 2021/0044989 | A1* | 2/2021 | Sekar .................. H04W 24/02 |
| 2021/0227615 | A1* | 7/2021 | Koskela ............... H04W 76/27 |
| 2021/0274394 | A1* | 9/2021 | Luo .................... H04W 36/0016 |
| 2021/0321300 | A9 | 10/2021 | Chen et al. |
| 2021/0352531 | A1* | 11/2021 | Vesely ................. H04W 76/19 |
| 2021/0377814 | A1* | 12/2021 | Sillanpaa ............. H04W 72/04 |
| 2022/0007212 | A1* | 1/2022 | Hwang ................. H04W 76/38 |

FOREIGN PATENT DOCUMENTS

| | | |
|---|---|---|
| CN | 109842910 A | 6/2019 |
| CN | 110603855 A | 12/2019 |
| KR | 20180039567 A | 4/2018 |
| WO | 2018199611 A1 | 11/2018 |
| WO | 2018227473 A1 | 12/2018 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification(Release 15)," 3GPP TS 36.331 V15.7.0, Sep. 2019, 962 pages.

"3rd Generation Partnership Project; Technical Specification Group Radio Access Network; NR; Radio Resource Control (RRC) protocol specification (Release 15)," 3GPP TS 38.331 V15.7.0, Sep. 2019, 527 pages.

"3rd Generation Partnership Project; Technical Specification Group Radio Access Network; NG-RAN; F1 application protocol (F1AP) (Release 15)," 3GPP TS 38.473 V15.7.0, Sep. 2019, 221 pages.

"Solution for UE Initial Access," Agenda Item: 10.10.1.5, Source: ZTE, China Telecom, Documen for: Discussion and Decision, 3GPP TSG RAN WG3 NR#98, R3-174396, Reno, USA, Nov. 27-Dec. 1, 2017, 7 pages.

* cited by examiner

COMMUNICATION METHOD AND APPARATUS

CROSS-REFERENCE TO RELATED APPLICATIONS

This application is a continuation of International Application No. PCT/CN2019/130985, filed on Dec. 31, 2019, the disclosure of which is hereby incorporated by reference in its entirety.

TECHNICAL FIELD

This application relates to the field of communication technologies, and in particular, to a communication method and apparatus.

BACKGROUND

In a country or a region, a cellular mobile communication network of a standard of an operator is referred to as a public land mobile network (PLMN). The PLMN is a network that is built and operated by a government or a proprietor authorized by the government and that provides land mobile telecommunication services for the public. The PLMN can interconnect with other communication networks such as a public switched telephone network (PSTN) to form a communication network of the entire region or country.

Specifically, to access a network, after being powered on, a terminal performs PLMN selection, to select an appropriate PLMN for communication. Currently, the terminal performs PLMN selection based only on prior information of a PLMN and a signal strength of a cell. However, when a cell supports a plurality of PLMNs, and all network slices in the plurality of PLMNs share a spectrum resource of the cell and a hardware resource of a base station to which the cell belongs, an existing PLMN selection mechanism may cause unleveled resource allocation for a same network slice in the PLMNs.

SUMMARY

Embodiments of this application provide a communication method and apparatus, to implement resource leveling.

To achieve the objective, this application provides the following technical solutions.

According to a first aspect, a communication method is provided and includes a distributed unit (DU) obtains resource occupation information of network slices that are in at least two PLMNs supported by a cell of the DU, and sends the resource occupation information to a centralized unit (CU). The network slices in the at least two PLMNs share a resource. According to the method provided in the first aspect, when an access network device is in a form in which the DU and the CU are separated, the DU may send the resource occupation information of the network slices that are in the PLMNs of the cell to the CU, so that the CU can use the resource occupation information to implement resource leveling.

In a possible implementation, the method further includes the DU receives request information from a terminal, and sends the request information to the CU. The request information includes an identifier of a first PLMN and an identifier of a first network slice, and the request information is used by the terminal to request to access the first network slice that is in the first PLMN. In this possible implementation, the DU may send, to the CU, the request information sent by the terminal, so that the CU obtains information about the PLMN and the network slice that are requested by the terminal.

In a possible implementation, the method further includes the DU receives release information from the CU, and sends the release information to the terminal. The release information is used to indicate the terminal to release an RRC connection to the CU. In this possible implementation, when the CU does not allow the terminal to access the first network slice that is in the first PLMN, the DU may be used to indicate the terminal to release the RRC connection, so that the terminal subsequently re-requests a network slice as soon as possible.

In a possible implementation, the release information includes a release cause, and the release cause includes that a resource of the first network slice in the first PLMN is insufficient. In this possible implementation, the terminal may determine a further action based on the cause for releasing the radio resource control (RRC) connection, for example, change a PLMN corresponding to a network slice, or roll back for specific time, and then initiate a corresponding network slice service request.

In a possible implementation, the resource occupation information is used by the CU to determine whether the terminal is allowed to access the first network slice that is in the first PLMN. In this possible implementation, the CU may determine, based on the resource occupation information, whether the terminal is allowed to access the first network slice that is in the first PLMN, so that access control can be performed on the terminal based on the resource occupation information, to implement resource leveling.

According to a second aspect, a communication apparatus is provided and includes a processing unit and a communication unit. The processing unit is configured to obtain resource occupation information of network slices that are in at least two PLMNs supported by a cell of the communication apparatus, where the network slices in the at least two PLMNs share a resource. The communication unit is configured to send the resource occupation information to a CU.

In a possible implementation, the communication unit is further configured to receive request information from a terminal, and send the request information to the CU, where the request information includes an identifier of a first PLMN and an identifier of a first network slice, and the request information is used by the terminal to request to access the first network slice that is in the first PLMN.

In a possible implementation, the communication unit is further configured to receive release information from the CU, and send the release information to the terminal, where the release information is used to indicate the terminal to release an RRC connection to the CU.

In a possible implementation, the release information includes a release cause, and the release cause includes that a resource of the first network slice in the first PLMN is insufficient.

In a possible implementation, the resource occupation information is used by the CU to determine whether the terminal is allowed to access the first network slice that is in the first PLMN.

According to a third aspect, a communication method is provided and includes a CU receives, from a DU, resource occupation information of network slices that are in at least two PLMNs supported by a cell of the DU, and uses the resource occupation information. The network slices in the at least two PLMNs share a resource. According to the method provided in the third aspect, the CU may receive the resource occupation information from the DU, and use the resource occupation information, to implement resource leveling.

In a possible implementation, the method further includes the CU receives request information from the DU, where the request information includes an identifier of a first PLMN and an identifier of a first network slice, and the request information is used by a terminal to request to access the first network slice that is in the first PLMN. That a CU uses the resource occupation information includes the CU sends release information to the DU when the CU determines, based on the resource occupation information, that the terminal is not allowed to access the first network slice that is in the first PLMN, and when the terminal establishes an RRC connection to the CU, where the release information is used to indicate the terminal to release the RRC connection to the CU. In this possible implementation, when the CU does not allow the terminal to access the first network slice that is in the first PLMN, the DU may be used to indicate the terminal to release the RRC connection, so that the terminal subsequently re-requests a network slice as soon as possible.

In a possible implementation, that the CU sends release information to the DU when the CU determines, based on the resource occupation information, that the terminal is not allowed to access the first network slice that is in the first PLMN, and when the terminal establishes an RRC connection to the CU includes the CU sends the release information to the DU when the CU determines, based on the resource occupation information, that a resource occupation rate of the first network slice in the first PLMN is greater than or equal to a threshold, and when the terminal establishes the RRC connection to the CU. In this possible implementation, the CU sends the release information to the DU when the resource occupation rate of the first network slice in the first PLMN is greater than or equal to the threshold, so that the terminal does not access a network slice with a high resource occupation rate, to implement resource leveling.

In a possible implementation, that the CU sends release information to the DU when the CU determines, based on the resource occupation information, that the terminal is not allowed to access the first network slice that is in the first PLMN, and when the terminal establishes an RRC connection to the CU includes the CU sends the release information to the DU when the CU determines, based on the resource occupation information, that the first network slice in the first PLMN is not a first network slice with a lowest resource occupation rate in first network slices that are in the at least two PLMNs, and when the terminal establishes the RRC connection to the CU. In this possible implementation, the CU sends the release information to the DU when the first network slice in the first PLMN is not the first network slice with the lowest resource usage in the first network slices that are in the at least two PLMNs, so that the terminal does not access a network slice with a high resource occupation rate, to implement resource leveling.

In a possible implementation, that the CU sends release information to the DU when the CU determines, based on the resource occupation information, that the terminal is not allowed to access the first network slice that is in the first PLMN, and when the terminal establishes an RRC connection to the CU includes the CU sends the release information to the DU when the CU determines, based on the resource occupation information, that a resource of the first network slice in the first PLMN is overloaded, and when the terminal establishes the RRC connection to the CU. In this possible implementation, the CU sends the release information to the DU when the resource of the first network slice in the first PLMN is overloaded, so that the terminal does not access a network slice with the overloaded resource, to implement resource leveling.

In a possible implementation, the release information includes a release cause, and the release cause includes that a resource of the first network slice in the first PLMN is insufficient. In this possible implementation, the terminal may determine a further action based on the cause for releasing the RRC connection, for example, change a PLMN corresponding to a network slice, or roll back for specific time, and then initiate a corresponding network slice service request.

In a possible implementation, the method further includes the CU sends, to an access and mobility management function (AMF) in the first PLMN, a cause for rejecting access of the terminal, where the cause includes that the resource of the first network slice in the first PLMN is insufficient. In this possible implementation, the AMF in the first PLMN may determine a further action based on the cause for releasing the RRC connection, for example, perform overload control on an overloaded network slice or a network slice that occupies a large quantity of resources.

According to a fourth aspect, a communication apparatus is provided and includes a processing unit and a communication unit. The communication unit is configured to receive, from a DU, resource occupation information of network slices that are in at least two PLMNs supported by a cell of the DU, where the network slices in the at least two PLMNs share a resource. The processing unit is configured to use the resource occupation information.

In a possible implementation, the communication unit is further configured to receive request information from the DU, where the request information includes an identifier of a first PLMN and an identifier of a first network slice, and the request information is used by a terminal to request to access the first network slice that is in the first PLMN. The processing unit is specifically configured to send release information to the DU via the communication unit when the communication apparatus determines, based on the resource occupation information, that the terminal is not allowed to access the first network slice that is in the first PLMN, and when the terminal establishes an RRC connection to the communication apparatus, where the release information is used to indicate the terminal to release the RRC connection to the communication apparatus.

In a possible implementation, the processing unit is specifically configured to send the release information to the DU via the communication unit when the communication apparatus determines, based on the resource occupation information, that a resource occupation rate of the first network slice in the first PLMN is greater than or equal to a threshold, and when the terminal establishes the RRC connection to the communication apparatus.

In a possible implementation, the processing unit is specifically configured to send the release information to the DU via the communication unit when the communication apparatus determines, based on the resource occupation information, that the first network slice in the first PLMN is not a first network slice with a lowest resource occupation rate in first network slices that are in the at least two PLMNs, and when the terminal establishes the RRC connection to the communication apparatus.

In a possible implementation, the processing unit is specifically configured to send the release information to the DU via the communication unit when the communication apparatus determines, based on the resource occupation information, that a resource of the first network slice in the first PLMN is overloaded, and when the terminal establishes the RRC connection to the communication apparatus.

In a possible implementation, the release information includes a release cause, and the release cause includes that a resource of the first network slice in the first PLMN is insufficient.

In a possible implementation, the communication unit is further configured to send, to an AMF in the first PLMN, a cause for rejecting access of the terminal, where the cause includes that the resource of the first network slice in the first PLMN is insufficient.

According to a fifth aspect, a communication method is provided and includes an access network device obtains resource occupation information of network slices that are in at least two PLMNs of a cell of the access network device, where the network slices in the at least two PLMNs share a resource. The access network device sends the resource occupation information to a terminal. According to the method provided in the fifth aspect, the access network device may send, to the terminal, the resource occupation information of the network slices that are in the at least two PLMNs of the cell of the access network device, and the terminal may use the resource occupation information, to implement resource leveling.

In a possible implementation, the resource occupation information is carried in system information. In this possible implementation, the terminal can obtain the resource occupation information without establishing an RRC connection to the access network device, so that a requested network slice can be determined early based on the resource occupation information.

According to a sixth aspect, a communication apparatus is provided and includes a processing unit and a communication unit. The processing unit is configured to obtain resource occupation information of network slices that are in at least two PLMNs of a cell of the communication apparatus, where the network slices in the at least two PLMNs share a resource. The communication unit is configured to send the resource occupation information to a terminal.

In a possible implementation, the resource occupation information is carried in system information.

According to a seventh aspect, a communication method is provided and includes a terminal receives resource occupation information from an access network device, where the resource occupation information is resource occupation information of network slices that are in at least two PLMNs of a cell of the access network device, and the network slices in the at least two PLMNs share a resource. The terminal uses the resource occupation information. According to the method provided in the seventh aspect, the terminal may receive the resource occupation information from the access network device and use the resource occupation information. For example, the terminal may request a network slice based on the resource occupation information, to implement resource leveling.

In a possible implementation, that the terminal uses the resource occupation information includes the terminal sends request information to the access network device based on the resource occupation information, where the request information includes an identifier of a first PLMN and an identifier of a first network slice, and the request information is used to request to access the first network slice that is in the first PLMN. In this possible implementation, the terminal may select, based on the resource occupation information, a network slice that is in a PLMN, to avoid selecting a network slice with a high resource occupation rate (or resource occupation amount) or an overloaded resource, and implement resource leveling.

In a possible implementation, that the terminal sends request information to the access network device based on the resource occupation information includes the terminal selects the first PLMN based on the resource occupation information. The terminal sends the request information to the access network device.

In a possible implementation, that the terminal selects the first PLMN based on the resource occupation information includes the terminal determines a PLMN list, where one PLMN in the list corresponds to one cell, and a signal strength of a cell corresponding to a PLMN is greater than or equal to a first threshold. The terminal sequentially performs determining in descending order of signal strengths of cells corresponding to PLMNs in the list, until a PLMN that meets a first condition is determined, where that a PLMN meets a first condition includes the PLMN can provide the first network slice for the terminal, and a resource occupied by the first network slice that is in the PLMN meets a second condition. The terminal determines the PLMN that meets the first condition as the first PLMN. In this possible implementation, the terminal may perform PLMN selection without prior information based on the resource occupation information, to avoid selecting a network slice with a high resource occupation rate (or resource occupation amount) or an overloaded resource, and implement resource leveling.

In a possible implementation, that the terminal selects the first PLMN based on the resource occupation information includes when there is a PLMN that meets a first condition in a PLMN maintained by the terminal, the terminal determines the PLMN that meets the first condition as the first PLMN. Otherwise, the terminal determines a PLMN list, sequentially performs determining in descending order of signal strengths of cells corresponding to PLMNs in the list, until a PLMN that meets a first condition is determined, and determines the PLMN that meets the first condition as the first PLMN, where one PLMN in the list corresponds to one cell, and a signal strength of a cell corresponding to a PLMN is greater than or equal to a first threshold. That a PLMN meets a first condition includes the PLMN can provide the first network slice for the terminal, and a resource occupied by the first network slice that is in the PLMN meets a second condition. In this possible implementation, the terminal may perform PLMN selection with prior information based on the resource occupation information, to avoid selecting a network slice with a high resource occupation rate (or resource occupation amount) or an overloaded resource, and implement resource leveling.

In a possible implementation, that a resource occupied by the first network slice that is in the PLMN meets a second condition includes a resource occupation rate of the first network slice in the PLMN is less than or equal to a second threshold, a quantity of resources occupied by the first network slice that is in the PLMN is less than or equal to a third threshold, or a resource of the first network slice in the PLMN is not overloaded.

According to an eighth aspect, a communication apparatus is provided and includes a communication unit and a processing unit. The communication unit is configured to receive resource occupation information from an access network device, where the resource occupation information is resource occupation information of network slices that are in at least two PLMNs of a cell of the access network device, and the network slices in the at least two PLMNs share a resource. The processing unit is configured to use the resource occupation information.

In a possible implementation, the processing unit is specifically configured to send request information to the access network device based on the resource occupation information, where the request information includes an identifier of a first PLMN and an identifier of a first network slice, and the request information is used to request to access the first network slice that is in the first PLMN.

In a possible implementation, the processing unit is specifically configured to select the first PLMN based on the resource occupation information, and send the request information to the access network device via the communication unit.

In a possible implementation, the processing unit is specifically configured to determine a PLMN list, where one PLMN in the list corresponds to one cell, and a signal strength of a cell corresponding to a PLMN is greater than or equal to a first threshold, sequentially perform determining in descending order of signal strengths of cells corresponding to PLMNs in the list, until a PLMN that meets a first condition is determined, where that a PLMN meets a first condition includes the PLMN can provide the first network slice for the communication apparatus, and a resource occupied by the first network slice that is in the PLMN meets a second condition, and determine the PLMN that meets the first condition as the first PLMN.

In a possible implementation, the processing unit is specifically configured to if there is a PLMN that meets a first condition in a PLMN maintained by the communication apparatus, determine the PLMN that meets the first condition as the first PLMN, otherwise, determine a PLMN list, sequentially perform determining sequentially descending order of signal strengths of cells corresponding to PLMNs in the list, until a PLMN that meets a first condition is determined, and determine the PLMN that meets the first condition as the first PLMN, where one PLMN in the list corresponds to one cell, and a signal strength of a cell corresponding to a PLMN is greater than or equal to a first threshold. That a PLMN meets a first condition includes the PLMN can provide the first network slice for the communication apparatus, and a resource occupied by the first network slice that is in the PLMN meets a second condition.

In a possible implementation, that a resource occupied by the first network slice that is in the PLMN meets a second condition includes a resource occupation rate of the first network slice in the PLMN is less than or equal to a second threshold, a quantity of resources occupied by the first network slice that is in the PLMN is less than or equal to a third threshold, or a resource of the first network slice in the PLMN is not overloaded.

According to a ninth aspect, a communication method is provided and includes a terminal sends a first message to an access network device in a cell of the access network device, where the first message is a message in a random access procedure, the first message can indicate a first PLMN and/or a first network slice, the first PLMN is a PLMN that the terminal expects to access, and the first network slice is a network slice that the terminal expects to access. The terminal receives a first response from the access network device, where the first response includes information about whether the terminal is allowed to access the first PLMN and/or the first network slice. According to the method provided in the ninth aspect, the terminal may indicate, based on a message in a random access procedure, information about the PLMN that the terminal expects to access and information about the network slice that the terminal expects to access, so that the access network device can obtain the information earlier, and perform access control on the terminal based on some subsequent interaction messages, to reduce signaling overheads.

In a possible implementation, the information about whether the terminal is allowed to access the first PLMN and/or the first network slice is determined by the access network device based on resource occupation information of network slices that are in at least two PLMNs of the cell, and the network slices in the at least two PLMNs share a resource. In this possible implementation, whether the terminal is allowed to access the first network slice that is in the first PLMN may be determined based on the resource occupation information, so that access control can be performed on the terminal based on the resource occupation information, to implement resource leveling.

In a possible implementation, the first message is a message 1, a message 3, or a message A.

In a possible implementation, the first message is a message 1 or a message A, the message 1 and the message A include a preamble, and a preamble set to which the preamble belongs corresponds to the first PLMN and/or the first network slice. In this possible implementation, a manner in which the access network device learns of the first PLMN and/or the first network slice that the terminal requests to access is provided.

In a possible implementation, the first message is a message 3, the message 3 includes a preset identifier, and the preset identifier corresponds to the first PLMN and/or the first network slice. In this possible implementation, a manner in which the access network device learns of the first PLMN and/or the first network slice that the terminal requests to access is provided.

In a possible implementation, the first message includes an identifier of the first PLMN and/or an identifier of the first network slice. In this possible implementation, a manner in which the access network device learns of the first PLMN and/or the first network slice that the terminal requests to access is provided.

In a possible implementation, the first message is a message A, and the identifier of the first PLMN and/or the identifier of the first network slice are/is carried in data payload.

In a possible implementation, that a terminal sends a first message to an access network device in a cell of the access network device includes the terminal sends the first message to the access network device by using a first physical random access channel (PRACH) resource, where the first PRACH resource corresponds to the first network slice that is in the first PLMN. In this possible implementation, a manner in which the access network device learns of the first network slice that the terminal requests to access and that is in the first PLMN is provided.

In a possible implementation, the method further includes the terminal receives, from the access network device, system information broadcast by the access network device, where the system information includes PRACH resources corresponding to network slices that are in a plurality of PLMNs. The terminal determines, based on the system information, the PRACH resources corresponding to the network slices that are in the plurality of PLMNs. In this possible implementation, the terminal can obtain a correspondence between the network slices in the plurality of PLMNs and the PRACH resources.

In a possible implementation, that a terminal sends a first message to an access network device in a cell of the access network device includes the terminal sends the first message to the access network device by using a second PRACH resource, where the second PRACH resource corresponds to the first network slice. In this possible implementation, a manner in which the access network device learns of the first network slice that the terminal requests to access is provided.

In a possible implementation, the method further includes the terminal receives, from the access network device, system information broadcast by the access network device, where the system information includes PRACH resources corresponding to network slices that are in a communication system. The terminal determines, based on the system information, the PRACH resources corresponding to the network slices that are in the communication system. In this possible implementation, the terminal can obtain a correspondence between the network slices and the PRACH resources.

In a possible implementation, that a terminal sends a first message to an access network device in a cell of the access network device includes the terminal sends the first message to the access network device by using a third PRACH resource, where the third PRACH resource corresponds to the first PLMN. In this possible implementation, a manner in which the access network device learns of the first PLMN that the terminal requests to access is provided.

In a possible implementation, the method further includes the terminal receives, from the access network device, system information broadcast by the access network device, where the system information includes PRACH resources corresponding to a plurality of PLMNs. The terminal determines, based on the system information, the PRACH resources corresponding to the plurality of PLMNs. In this possible implementation, the terminal can obtain a correspondence between the plurality of PLMNs and the PRACH resources.

In a possible implementation, if the terminal is not allowed to access the first network slice that is in the first PLMN, the first response includes a rejection cause, and the rejection cause includes that a resource of the first PLMN and/or the first network slice is insufficient. In this possible implementation, the terminal can learn of a cause for rejecting access to the first PLMN and/or the first network slice.

According to a tenth aspect, a communication apparatus is provided and includes a processing unit and a communication unit. The processing unit is configured to send a first message to an access network device in a cell of the access network device via the communication unit, where the first message is a message in a random access procedure, the first message can indicate a first PLMN and/or a first network slice, the first PLMN is a PLMN that the communication apparatus expects to access, and the first network slice is a network slice that the communication apparatus expects to access. The processing unit is further configured to receive a first response from the access network device via the communication unit, where the first response includes information about whether the communication apparatus is allowed to access the first PLMN and/or the first network slice.

In a possible implementation, the information about whether the communication apparatus is allowed to access the first PLMN and/or the first network slice is determined by the access network device based on resource occupation information of network slices that are in at least two PLMNs of the cell, and the network slices in the at least two PLMNs share a resource.

In a possible implementation, the first message is a message 1, a message 3, or a message A.

In a possible implementation, the first message is a message 1 or a message A, the message 1 and the message A include a preamble, and a preamble set to which the preamble belongs corresponds to the first PLMN and/or the first network slice.

In a possible implementation, the first message is a message 3, the message 3 includes a preset identifier, and the preset identifier corresponds to the first PLMN and/or the first network slice.

In a possible implementation, the first message includes an identifier of the first PLMN and/or an identifier of the first network slice.

In a possible implementation, the first message is a message A, and the identifier of the first PLMN and/or the identifier of the first network slice are/is carried in data payload.

In a possible implementation, the processing unit is specifically configured to send, via the communication unit, the first message to the access network device by using a first PRACH resource, where the first PRACH resource corresponds to the first network slice that is in the first PLMN.

In a possible implementation, the processing unit is further configured to receive, from the access network device via the communication unit, system information broadcast by the access network device, where the system information includes PRACH resources corresponding to network slices that are in a plurality of PLMNs. The processing unit is further configured to determine, based on the system information, the PRACH resources corresponding to the network slices that are in the plurality of PLMNs.

In a possible implementation, the processing unit is specifically configured to send, via the communication unit, the first message to the access network device by using a second PRACH resource, where the second PRACH resource corresponds to the first network slice.

In a possible implementation, the processing unit is further configured to receive, from the access network device via the communication unit, system information broadcast by the access network device, where the system information includes PRACH resources corresponding to network slices that are in the communication system. The processing unit is further configured to determine, based on the system information, the PRACH resources corresponding to the network slices that are in the communication system.

In a possible implementation, the processing unit is specifically configured to send, via the communication unit, the first message to the access network device by using a third PRACH resource, where the third PRACH resource corresponds to the first PLMN.

In a possible implementation, the processing unit is further configured to receive, from the access network device via the communication unit, system information broadcast by the access network device, where the system information includes PRACH resources corresponding to a plurality of PLMNs. The processing unit is further configured to determine, based on the system information, the PRACH resources corresponding to the plurality of PLMNs.

In a possible implementation, if the communication apparatus is not allowed to access the first network slice that is in the first PLMN, the first response includes a rejection cause, and the rejection cause includes that a resource of the first PLMN and/or the first network slice is insufficient.

According to an eleventh aspect, a communication method is provided and includes an access network device receives a first message from a terminal in a cell of the access network device, where the first message is a message in a random access procedure, the first message can indicate a first PLMN and/or a first network slice, the first PLMN is a PLMN that the terminal expects to access, and the first network slice is a network slice that the terminal expects to access. The access network device sends a first response to the terminal, where the first response includes information about whether the terminal is allowed to access the first PLMN and/or the first network slice. According to the method provided in the eleventh aspect, the terminal may indicate, based on a message in a random access procedure, information about the PLMN that the terminal expects to access and information about the network slice that the terminal expects to access, so that the access network device can obtain the information earlier, and perform access control on the terminal based on some subsequent interaction messages, to reduce signaling overheads.

In a possible implementation, that the access network device sends a first response to the terminal includes the access network device sends the first response to the terminal based on resource occupation information of network slices that are in at least two PLMNs of the cell, where the network slices in the at least two PLMNs share a resource. In this possible implementation, the access network device may determine, based on the resource occupation information, whether the terminal is allowed to access the first network slice that is in the first PLMN, so that access control can be performed on the terminal based on the resource occupation information, to implement resource leveling.

In a possible implementation, the first message is a message 1, a message 3, or a message A.

In a possible implementation, the first message is a message 1 or a message A, the message 1 and the message A include a preamble, and a preamble set to which the preamble belongs corresponds to the first PLMN and/or the first network slice. In this possible implementation, a manner in which the access network device learns of the first PLMN and/or the first network slice that the terminal requests to access is provided.

In a possible implementation, the first message is a message 3, the message 3 includes a preset identifier, and the preset identifier corresponds to the first PLMN and/or the first network slice. In this possible implementation, a manner in which the access network device learns of the first PLMN and/or the first network slice that the terminal requests to access is provided.

In a possible implementation, the first message includes an identifier of the first PLMN and/or an identifier of the first network slice. In this possible implementation, a manner in which the access network device learns of the first PLMN and/or the first network slice that the terminal requests to access is provided.

In a possible implementation, the first message is a message A, and the identifier of the first PLMN and/or the identifier of the first network slice are/is carried in data payload.

In a possible implementation, that an access network device receives a first message from a terminal in a cell of the access network device includes the access network device receives the first message from the terminal on a first PRACH resource, where the first PRACH resource corresponds to the first network slice that is in the first PLMN. In this possible implementation, a manner in which the access network device learns of the first network slice that the terminal requests to access and that is in the first PLMN is provided.

In a possible implementation, the method further includes the access network device broadcasts system information, where the system information includes PRACH resources corresponding to network slices that are in a plurality of PLMNs. In this possible implementation, the terminal can obtain a correspondence between the network slices in the plurality of PLMNs and the PRACH resources.

In a possible implementation, that an access network device receives a first message from a terminal in a cell of the access network device includes the access network device receives the first message from the terminal on a second PRACH resource, where the second PRACH resource corresponds to the first network slice. In this possible implementation, a manner in which the access network device learns of the first network slice that the terminal requests to access is provided.

In a possible implementation, the method further includes the access network device broadcasts system information, where the system information includes PRACH resources corresponding to network slices that are in a communication system. In this possible implementation, the terminal can obtain a correspondence between the network slices and the PRACH resources.

In a possible implementation, that an access network device receives a first message from a terminal in a cell of the access network device includes the access network device receives the first message from the terminal on a third PRACH resource, where the third PRACH resource corresponds to the first PLMN. In this possible implementation, a manner in which the access network device learns of the first PLMN that the terminal requests to access is provided.

In a possible implementation, the method further includes the access network device broadcasts system information, where the system information includes PRACH resources corresponding to a plurality of PLMNs. In this possible implementation, the terminal can obtain a correspondence between the plurality of PLMNs and the PRACH resources.

In a possible implementation, if the terminal is not allowed to access the first PLMN and/or the first network slice, the first response includes a rejection cause, and the rejection cause includes that a resource of the first PLMN and/or the first network slice is insufficient. In this possible implementation, the terminal can learn of a cause for rejecting access to the first PLMN and/or the first network slice.

According to a twelfth aspect, a communication apparatus is provided and includes a communication unit and a processing unit. The processing unit is configured to receive a first message from a terminal in a cell of the communication apparatus via the communication unit, where the first message is a message in a random access procedure, the first message can indicate a first PLMN and/or a first network slice, the first PLMN is a PLMN that the terminal expects to access, and the first network slice is a network slice that the terminal expects to access. The processing unit is further configured to send a first response to the terminal via the communication unit, where the first response includes information about whether the terminal is allowed to access the first PLMN and/or the first network slice.

In a possible implementation, the processing unit is specifically configured to send, via the communication unit, a first response to the terminal based on resource occupation information of network slices that are in at least two PLMNs of the cell, where the network slices in the at least two PLMNs share a resource.

In a possible implementation, the first message is a message 1, a message 3, or a message A.

In a possible implementation, the first message is a message 1 or a message A, the message 1 and the message A include a preamble, and a preamble set to which the preamble belongs corresponds to the first PLMN and/or the first network slice.

In a possible implementation, the first message is a message 3, the message 3 includes a preset identifier, and the preset identifier corresponds to the first PLMN and/or the first network slice.

In a possible implementation, the first message includes an identifier of the first PLMN and/or an identifier of the first network slice.

In a possible implementation, the first message is a message A, and the identifier of the first PLMN and/or the identifier of the first network slice are/is carried in data payload.

In a possible implementation, the processing unit is specifically configured to receive, via the communication unit, the first message from the terminal on a first PRACH resource, where the first PRACH resource corresponds to the first network slice that is in the first PLMN.

In a possible implementation, the processing unit is further configured to broadcast system information via the communication unit, where the system information includes PRACH resources corresponding to network slices that are in a plurality of PLMNs.

In a possible implementation, the processing unit is specifically configured to receive, via the communication unit, the first message from the terminal on a second PRACH resource, where the second PRACH resource corresponds to the first network slice.

In a possible implementation, the processing unit is further configured to broadcast system information via the communication unit, where the system information includes PRACH resources corresponding to network slices that are in a communication system.

In a possible implementation, the processing unit is specifically configured to receive, via the communication unit, the first message from the terminal on a third PRACH resource, where the third PRACH resource corresponds to the first PLMN.

In a possible implementation, the processing unit is further configured to broadcast system information via the communication unit, where the system information includes PRACH resources corresponding to a plurality of PLMNs.

In a possible implementation, if the terminal is not allowed to access the first PLMN and/or the first network slice, the first response includes a rejection cause, and the rejection cause includes that a resource of the first PLMN and/or the first network slice is insufficient.

According to a thirteenth aspect, a communication apparatus is provided. The communication apparatus includes a memory and a processor, and optionally, further includes at least one communication interface and a communication bus. The memory is configured to store computer-executable instructions. The processor, the memory, and the at least one communication interface are connected by using the communication bus. The processor executes the computer-executable instructions stored in the memory, so that the communication apparatus implements any method provided in any one of the first aspect, the third aspect, the fifth aspect, the seventh aspect, the ninth aspect, and the eleventh aspect. The apparatus may exist in a form of a chip product.

According to a fourteenth aspect, a communication system is provided and includes the communication apparatuses provided in the second aspect and the fourth aspect, the communication apparatus provided in the sixth aspect and the eighth aspect, or the communication apparatuses provided in the tenth aspect and the twelfth aspect.

According to a fifteenth aspect, a computer-readable storage medium is provided and includes instructions. When the instructions are run on a computer, the computer is enabled to perform any method provided in any one of the first aspect, the third aspect, the fifth aspect, the seventh aspect, the ninth aspect, and the eleventh aspect.

According to a sixteenth aspect, a computer program product including instructions is provided. When the computer program product runs on a computer, the computer is enabled to perform any method provided in any one of the first aspect, the third aspect, the fifth aspect, the seventh aspect, the ninth aspect, and the eleventh aspect.

According to a seventeenth aspect, a chip is provided. The chip includes a processor and an interface, where the processor is coupled to a memory through the interface. When the processor executes a computer program or instructions in the memory, any method provided in any one of the first aspect, the third aspect, the fifth aspect, the seventh aspect, the ninth aspect, and the eleventh aspect is performed.

For technical effects brought by any design manner in the second aspect, the fourth aspect, the sixth aspect, the eighth aspect, the tenth aspect, or the twelfth aspect to the seventeenth aspect, refer to technical effects brought by corresponding design manners in the first aspect, the third aspect, the fifth aspect, the seventh aspect, the ninth aspect, and the eleventh aspect. Details are not described herein again.

It should be noted that various possible implementations of any one of the foregoing aspects may be combined provided that the solutions are not contradictory.

DETAILED DESCRIPTION OF ILLUSTRATIVE EMBODIMENTS

Figure 1:
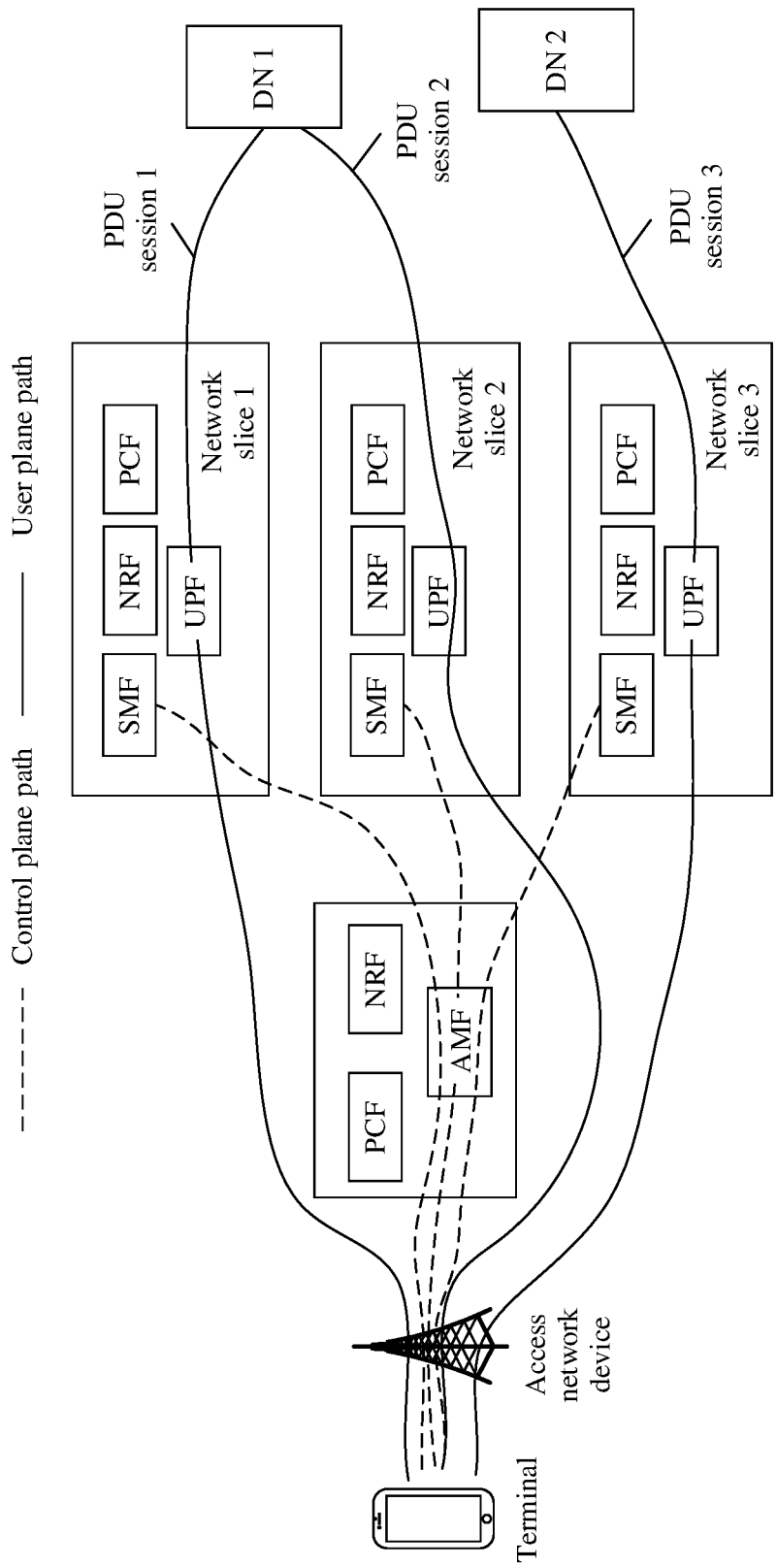
FIG. 1 is a schematic diagram of an architecture of a network slice.

In descriptions of this application, unless otherwise specified, "/" means "or". For example, A/B may represent A or B. A term "and/or" in this specification describes only an association relationship between associated objects and indicates that there may be three relationships. For example, A and/or B may represent the following three cases: Only A exists, both A and B exist, and only B exists. In addition, "at least one" means one or more, and "a plurality of" means two or more. Terms such as "first" and "second" do not limit a quantity and an execution sequence, and the terms such as "first" and "second" do not indicate a definite difference.

It should be noted that in this application, terms such as "example" or "for example" are used to indicate giving an example, an illustration, or a description. Any embodiment or design solution described by using "example" or "for example" in this application shall not be construed as being more preferred or more advantageous than another embodiment or design solution. Exactly, use of the term such as "example" or "for example" is intended to present a related concept in a specific manner.

Network elements in this application include an access network device and a terminal in a communication system.

The communication system in embodiments of this application includes but is not limited to a long term evolution (LTE) system, a 5th generation (5G) system, a new radio (NR) system, a wireless local area network (WLAN) system, a future evolved system, or a plurality of converged communication systems. For example, the method provided in embodiments of this application may be specifically applied to an evolved universal terrestrial radio access network (E-UTRAN) and a next generation radio access network (NG-RAN) system.

The access network device in embodiments of this application is an entity that is on a network side and that is configured to send a signal, receive a signal, or send a signal and receive a signal. The access network device may be an apparatus that is deployed in a radio access network (RAN) and that provides a wireless communication function for a terminal, for example, may be a transmission/reception point (TRP), a base station, various forms of control nodes (for example, a network controller, a radio controller (for example, a radio controller in a cloud radio access network (CRAN) scenario)), a road side unit (RSU), and the like. Specifically, the access network device may be a macro base station, a micro base station (also referred to as a small cell), a relay station, an access point (access point, AP), or the like in various forms, or may be an antenna panel of a base station. The control node may be connected to a plurality of base stations, and configure resources for a plurality of terminals within coverage of the plurality of base stations. In systems using different radio access technologies (RATs), names of devices having a function of a base station may be different. For example, the device may be referred to as an evolved NodeB (evolved NodeB, eNB or eNodeB) in the LTE system, or may be referred to as a next generation NodeB (gNB) in a 5G system or an NR system. A specific name of the base station is not limited in this application. Alternatively, the access network device may be an access network device in a future evolved public land mobile network (PLMN) or the like.

The terminal in embodiments of this application is an entity that is on a user side and that is configured to receive a signal, send a signal, or receive a signal and send a signal. The terminal is configured to provide a user with one or more of a voice service and a data connectivity service. The terminal may also be referred to as user equipment (UE), a terminal device, an access terminal, a subscriber unit, a subscriber station, a mobile station, a remote station, a remote terminal, a mobile device, a user terminal, a wireless communication device, a user agent, or a user apparatus. The terminal may be a vehicle to everything (V2X) device, for example, a smart car (smart car or intelligent car), a digital car, an unmanned car (unmanned car, driverless car, pilotless car, or automobile), a self-driving car (self-driving car or autonomous car), a pure electric vehicle (pure EV or Battery EV), a hybrid electric vehicle (HEV), a range extended electric vehicle (range extended EV, REEV), a plug-in hybrid electric vehicle (plug-in HEV, PHEV), or a new energy vehicle. Alternatively, the terminal may be a device-to-device (D2D) device, for example, an electricity meter or a water meter. Alternatively, the terminal may be a mobile station (MS), a subscriber unit, a drone, an internet of things (IoT) device, a station (ST) in a WLAN, a cellular phone, a smartphone, a cordless telephone set, a wireless data card, a tablet computer, a session initiation protocol (SIP) phone, a wireless local loop (WLL) station, a personal digital assistant (PDA) device, a laptop computer, a machine type communication (MTC) terminal, a handheld device having a wireless communication function, a computing device, another processing device connected to a wireless modem, a vehicle-mounted device, or a wearable device (which may also be referred to as a wearable intelligent device). Alternatively, the terminal may be a terminal in a next-generation communication system, for example, a terminal in a 5G system, a terminal in a future evolved PLMN, or a terminal in an NR system.

To clarify this application, some concepts or content in this application are first briefly described.

1. RAN Sharing

Operators face many challenges in standalone, for example, high spectrum license fees, high network deployment costs, and pressure of a requirement for providing high network coverage in a short period of time. To address these challenges, a concept of network sharing, namely, RAN sharing, is introduced. RAN sharing means that a RAN is shared by a plurality of operators.

There are three types of RAN sharing: RAN sharing with common carrier, RAN sharing with dedicated carrier, and hybrid RAN sharing.

RAN sharing with common carrier means that a plurality of operators share a RAN resource. The RAN resource includes a cell spectrum resource (for example, a time domain resource and a frequency domain resource) and a hardware resource of an access network device to which a cell belongs (for example, a computing resource of the access network device and a storage resource of the access network device). In this case, the plurality of operators share the same cell, and a plurality of PLMN identifiers (PLMN IDs) (including a PLMN ID of one primary operator and PLMN IDs of a plurality of secondary operators) are broadcast in the cell.

RAN sharing with dedicated carrier means that a plurality of operators share a hardware resource of an access network device but do not share a spectrum resource (in other words, do not share a cell). In this case, only one PLMN ID is broadcast in each cell, and different operators use independent cells. Therefore, a cell air interface resource is not shared.

Hybrid RAN sharing means that a plurality of operators share a hardware resource of an access network device, and share or exclusively use a cell spectrum resource. In this case, a plurality of PLMN IDs (including a PLMN ID of one primary operator and PLMN IDs of a plurality of secondary operators, where PLMN IDs of primary operators of different cells may be different) may be broadcast in some cells, and only one PLMN ID may be broadcast in each of some other cells.

The method provided in embodiments of this application is mainly applicable to scenarios of RAN sharing with common carrier and hybrid RAN sharing, and is specifically applied to a case in which a plurality of PLMN IDs are broadcast in one cell. That is, there are a plurality of PLMNs of a cell in embodiments of this application.

2. Network Slice

With development of mobile communication technologies, various new services and application scenarios continuously emerge, and requirements of these services for network functions, connection performance, security, and the like are greatly different. If a single network is used to carry these services, it is difficult to meet requirements on high bandwidth, low latency, and high reliability at the same time. In addition, building a new network for each type of service brings huge costs. This requires a 5G network to be flexible and scalable to meet different service requirements. Therefore, an end-to-end network slice is used on the 5G network to provide a customized network service for a user.

Specifically, through flexible allocation of network resources and on-demand networking, a plurality of isolated logical subnets with different characteristics may be virtualized on a same physical infrastructure in a 5G network to provide services for users. One logical subnet is one network slice.

For example, refer to FIG. 1. FIG. 1 shows three network slices a network slice 1, a network slice 2, and a network slice 3. The network slice 1, the network slice 2, and the network slice 3 may be respectively a network slice of an enhanced mobile broadband (eMBB) service, a network slice of an ultra-reliable low-latency communication (URLLC) service, and a network slice of a massive machine-type communications (massive machine-type communications, mMTC) service.

When a terminal initiates a request for a network slice, an access network device selects, via an access and mobility management function (AMF) that can support the network slice, a session management function (SMF) and a network repository function (NRF) that support the network slice, and the SMF further selects a user plane function (UPF) that supports the network slice. Optionally, the SMF further selects a policy control function (PCF) that supports the network slice. A service of the network slice is provided for the terminal via the selected network elements. For example, when the terminal initiates a request for a network slice 1, the access network device selects, via an AMF that can support the network slice 1, an SMF and an NRF that support the network slice 1, and the SMF further selects a UPF that supports the network slice 1. Optionally, the SMF further selects a PCF that supports the network slice 1. A service of the network slice 1 is provided for the terminal via the selected network elements.

Different network slices are identified and distinguished based on single network slice selection assistance information (S-NSSAI). Each S-NSSAI may include the following content, including (1) a slice/service type (SST), indicating a specific feature and service type of a network slice, and (2) a slice differentiator (SD) (optional) that is used as a supplement to the SST and that may further distinguish between a plurality of network slice instances satisfying a same SST.

Optionally, in embodiments of this application, an identifier of the network slice may alternatively be any one or more of the following parameters, including (1) network slice type information, where for example, the network slice type information may indicate a network slice type such as eMBB, URLLC, or mMTC, and optionally, the network slice type information may further indicate a type of an end-to-end network slice, including a type of a RAN-core network (CN) network slice, or may be a type of a RAN-side network slice or a type of a CN-side network slice, (2) service type information, related to a specific service, where for example, the service type information may indicate information about a service feature or a specific service such as a video service, a vehicle-to-everything service, or a voice service, and it should be understood that the service type information and the network slice type information may be combined into one type of information, (3) tenant information, used to indicate information about a client creating or renting the network slice, for example, Tencent or the State Grid, (4) user group information, used to indicate grouping information for grouping users based on a feature such as a user level, (5) slice group information, used to indicate that network slices may be grouped based on a feature, for example, all network slices that can be accessed by a terminal may be used as a slice group, or network slices may be grouped based on another standard, (6) network slice instance information, used to indicate an instance identifier and feature information that are created for the network slice, where for example, an identifier may be allocated to a network slice instance to indicate the network slice instance, or a new identifier may be mapped based on an identifier of a network slice instance and associated with the network slice instance, and a receiver may identify, based on the identifier, the specific network slice instance indicated by the identifier, (7) a dedicated core network (DCN) identifier, where the identifier is used to uniquely indicate a dedicated core network in an LTE system or an eLTE system, for example, a dedicated core network in the Internet of Things, optionally, mapping may be performed between the DCN identifier and the identifier of the network slice, and the identifier of the network slice may be obtained through mapping by using the DCN identifier, or the DCN identifier may be obtained through mapping by using the network slice identifier, and (8) a network slice differentiator, used to further distinguish between information about network slices, where optionally, two or more network slices have a same network slice type and/or service type, and the two or more network slices may be further distinguished based on network slice differentiation information, that is, the network slice type information and the network slice differentiator may be used to identify a network slice.

It should be understood that, in embodiments of this application, at least one of the foregoing parameters may be used to represent an identifier of a network slice. For example, an identifier of a network slice may be represented by using a network slice type, may be represented by using a network slice type and a service type, or may be represented by using a service type and tenant information. This is not limited in embodiments of this application.

3. Existing PLMN Selection and Cell Selection

After a terminal is powered on, an access stratum (AS) of the terminal automatically searches for a network, or a non-access stratum (NAS) of the terminal searches for a specified network parameter, to implement PLMN selection.

Figure 2:
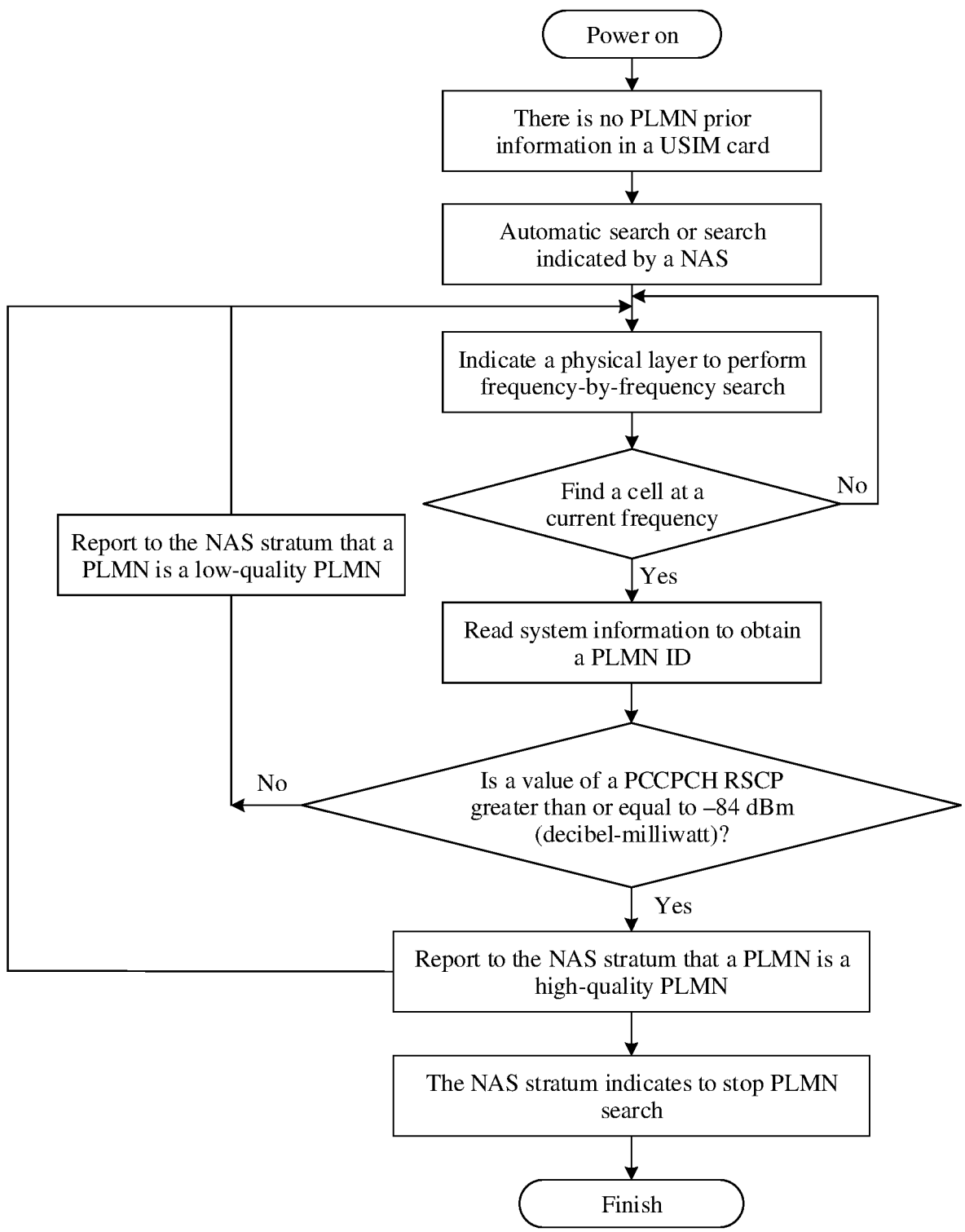
FIG. 2 and FIG. 3 each are a flowchart of PLMN selection.
Figure 3:
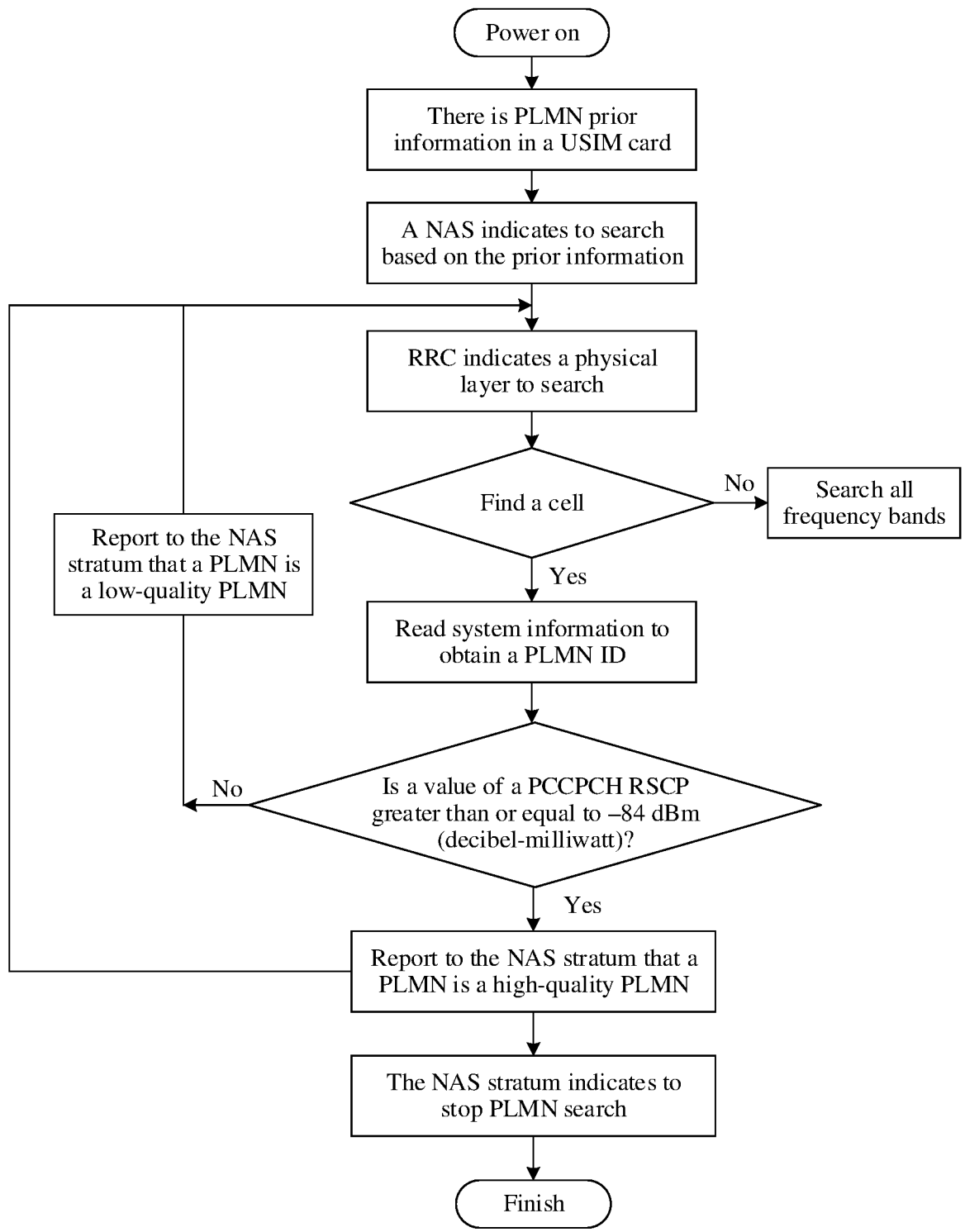

There are two types of PLMN selection procedures. One is a PLMN selection procedure performed when the terminal does not have prior information, and the other is a PLMN selection procedure performed when the terminal stores prior information. The two procedures are slightly different. If the terminal does not have the prior information, the terminal searches all frequency bands, searches for a strongest cell on each frequency, and reports the cell to the NAS stratum of the terminal. The NAS stratum determines whether to continue a PLMN search. For a specific procedure, refer to FIG. 2. If the terminal stores the prior information, the NAS stratum indicates the AS stratum to perform a PLMN search based on a parameter of the prior information, and report a result to the NAS stratum. For a specific procedure, refer to FIG. 3. For specific implementation of steps in FIG. 2 and FIG. 3, refer to a conventional technology, and details are not described. In FIG. 2 and FIG. 3, a "USIM" refers to a universal subscriber identity module, and a "PCCPCH RSCP" refers to a primary common control physical channel (PCCPCH) received signal code power (RSCP).

After the PLMN selection procedure ends, the NAS indicates the AS to perform a cell search procedure in a specified PLMN based on the selected PLMN. The cell search procedure includes two cases. One is an initial cell search performed when the terminal stores no cell information. In this case, the terminal needs to search all frequency bands, and search for a strongest cell on each frequency. When signal quality of a cell meets an S criterion, the terminal may select the cell to camp on. The other case is a cell search procedure performed when the terminal stores cell information. In this case, the terminal only needs to search for cells, and after finding the cells, determines whether signal quality of the cells meets an S criterion. When signal quality of a cell meets the S criterion, the terminal selects the cell to camp on.

In the foregoing descriptions, an output result of PLMN selection is that the NAS obtains PLMN information that currently meets a condition, to prepare for cell selection. An output result of cell selection is that a suitable cell in the PLMN selected by the NAS is found and successfully camped on, to prepare for initiating a radio resource control (RRC) connection or cell reselection in a next step.

4. System Information

After a cell search procedure, a terminal has performed downlink synchronization with a cell. Then, the terminal needs to obtain system information (system information, SI) of the cell, to know how the cell is configured, so as to access the cell and work normally in the cell.

System information in an LTE system is mainly classified into a master information block (MIB) and a system information block (SIB), and SIBs are further classified into 26 types a system information block type 1 to a system information block type 26, briefly referred to as an SIB1, an SIB2, . . . , and an SIB26. Each piece of system information includes a set of a series of parameters related to a function. System information that needs to be obtained by the terminal to normally camp on a cell and initiate random access includes a MIB, the SIB1, and the SIB2.

System information in NR is mainly classified into a MIB and SIBs. SIBs other than the MIB and an SIM are referred to as other system information (OSI). The SIBs are classified into nine types a system information block type 1 to a system information block type 9, briefly referred to as an SIB1, an SIB2, . . . , and an SIB9. System information that needs to be obtained by the terminal to normally camp on a cell and initiate random access includes the MIB and the SIB1.

5. Existing Random Access Mechanism

After cell selection, a terminal may establish, based on a random access procedure, an RRC connection to an access network device to which a cell belongs.

The random access procedure is used by the terminal to establish a connection to the cell and perform uplink synchronization with the cell. Random access procedures are classified into a 4-step random access procedure and a 2-step random access procedure. There are two types of random access: contention-based random access and non-contention-based random access.

Figure 4:
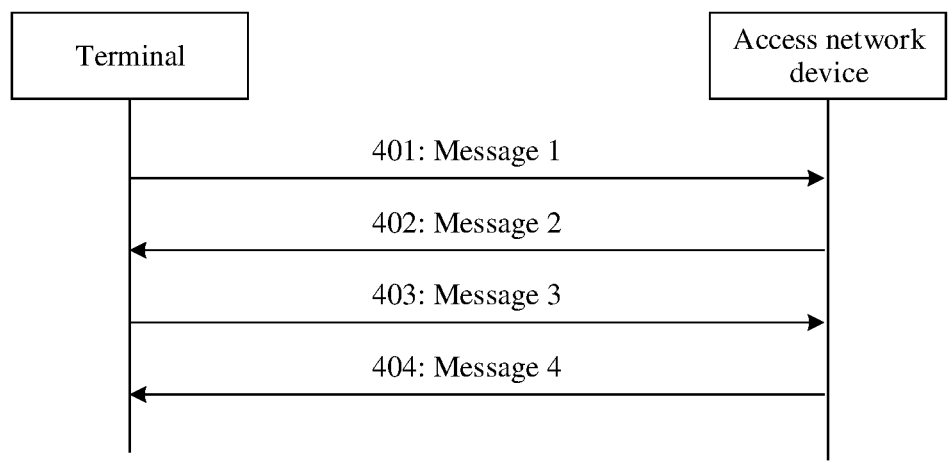
FIG. 4 is a flowchart of a 4-step random access procedure.

FIG. 4 is a schematic diagram of a 4-step random access procedure. A contention-based random access procedure includes the following step 401 to step 404, and a non-contention-based random access procedure includes the following step 401 and step 402.

401 a terminal sends a message 1 (Msg1) to an access network device, where the message 1 includes a preamble.

The preamble may also be referred to as a random access preamble, a random access preamble sequence, a preamble sequence, or the like.

The message 1 may notify the access network device that there is a random access request, so that the access network device can estimate a transmission delay between the access network device and the terminal, and determine a timing advance (TA) based on the transmission delay. The message 1 may be carried on a physical random access channel (PRACH).

In contention-based random access, a PRACH resource and a preamble are selected by the terminal, and different terminals may select a same PRACH resource and a same preamble at the same time. Consequently, a conflict occurs. In this case, a contention resolution mechanism (in other words, step 403 and step 404) is required to resolve the problem.

In non-contention-based random access, the terminal already has a unique cell radio network temporary identifier (C-RNTI) in an accessed cell, and a PRACH resource and a preamble are specified by the access network device, so as to ensure that the terminal does not conflict with another terminal. Therefore, no contention resolution mechanism is required (in other words, steps 403 and 404 are not required).

402 the access network device sends a message 2 (Msg2) to the terminal.

The message 2 may be a random access response (random access response, RAR).

The message 2 may include a TA, and the TA is the TA obtained by the access network device through calculation for the terminal based on the message 1.

403 the terminal sends a message 3 (Msg3) to the access network device.

In step 403, the terminal may send the message 3 to the access network device based on the TA in the message 2.

The message 3 needs to include one piece of important information: information about a contention resolution identity (contention resolution ID) of a terminal, and the identity is used for contention resolution in step 404.

404 the access network device sends a message 4 (Msg4) to the terminal, to indicate a contention result of random access of the terminal.

In the contention resolution mechanism, the access network device includes the contention resolution identity of the terminal in the message 4 to specify a terminal that succeeds in contention resolution, and another terminal that fails in contention resolution re-initiates random access.

Figure 5:
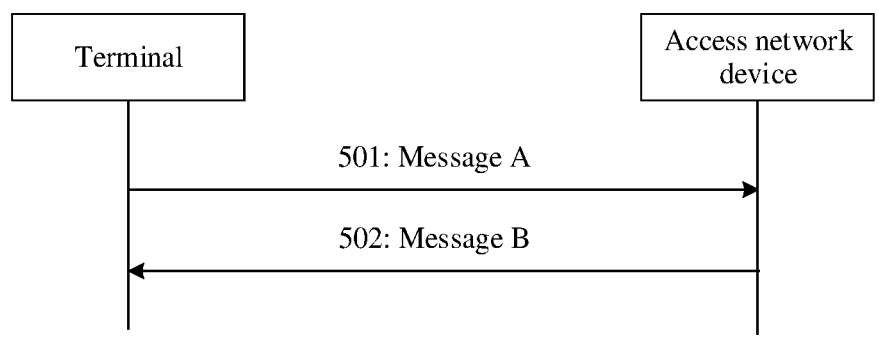
FIG. 5 is a flowchart of a 2-step random access procedure.

FIG. 5 is a schematic diagram of a 2-step random access procedure, including the following steps.

501 the terminal sends a message A (MsgA) to the access network device.

The message A includes a random access signal and payload data. The random access signal may include a preamble and/or a demodulation reference signal (demodulation reference signal, DMRS). The random access signal is used to receive the payload data. For example, a transmission boundary (for example, a start location and an end location of a slot (slot) for transmitting the payload data) or demodulation of the payload data may be determined based on the random access signal. The payload data may be control plane data and/or user plane data. The payload data may correspond to content included in the message 3 in the foregoing 4-step random access mechanism. For example, the payload data may include any one of an RRC connection request, an identifier of the terminal, a scheduling request, a buffer status report (buffer status report, BSR), real service data, and the like.

502 the access network device sends a message B (MsgB) to the terminal.

The message B is used to carry a response message for the random access signal and the payload data. The response message may include at least one of information about a C-RNTI, information about a timing advance command (TA command), information about an uplink grant, information about a contention resolution identity, and the like. The contention resolution identity may be some or all of content of the payload data. In addition, the response message further includes a control plane message (which may also be considered as a response message based on scheduling transmission). For example, in different terminal statuses and different trigger scenarios, the response message may further include one of the following an RRC connection (RRCSetup) message, an RRC reestablishment (RRCReestablishment) message, an RRC resume (RRCResume) message, and the like.

Figure 6:
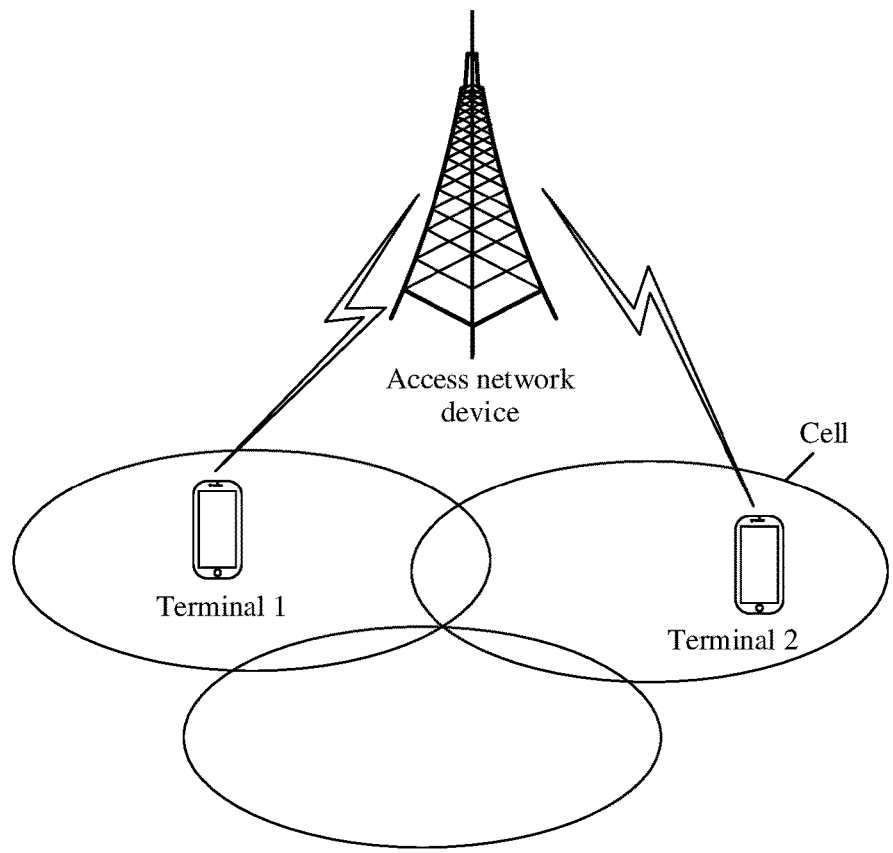
FIG. 6 and FIG. 7 each are a diagram of a network architecture applicable to an embodiment of this application.
Figure 7:
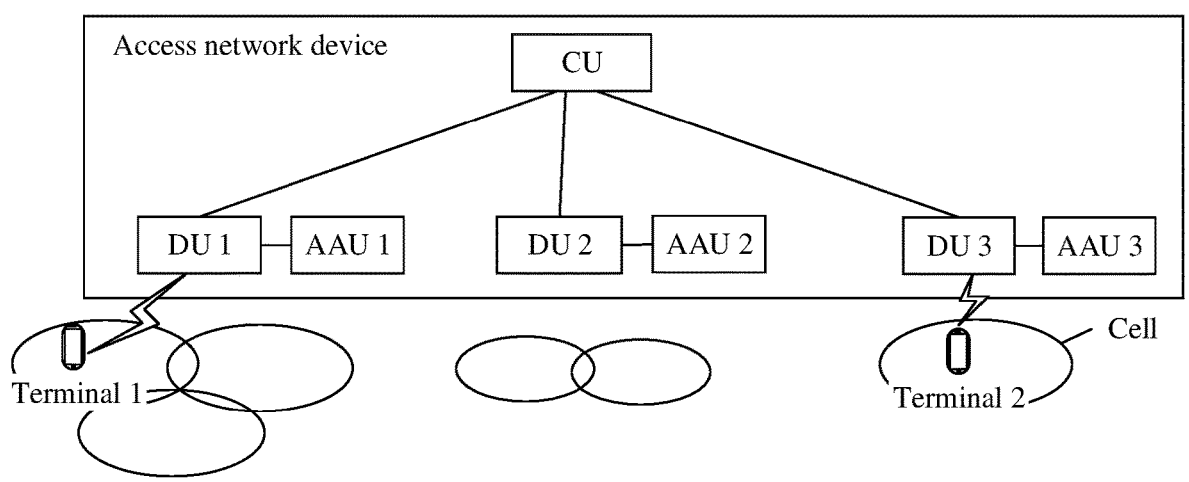

The method provided in embodiments of this application may be applied to network architectures shown in FIG. 6 and FIG. 7.

In FIG. 6, an access network device is a complete entity. The access network device covers one or more cells (three cells are used as an example for drawing in FIG. 6), and a terminal (for example, a terminal 1 and a terminal 2 in FIG. 6) may communicate with the access network device in a cell.

In FIG. 7, an access network device is a form in which a centralized unit (CU) and a distributed unit (DU) are separated. In this case, the access network device may include the CU, the DU, and an active antenna unit (AAU). The CU may manage one or more DUs (three DUs are used as an example for drawing in FIG. 7), and each DU may cover one or more cells. For example, in FIG. 7, a DU 1 covers three cells, a DU 2 covers two cells, and a DU 3 covers one cell. A terminal (for example, a terminal 1 and a terminal 2 in FIG. 7) may communicate with the CU in a cell via a DU to which the cell belongs.

The CU implements a part of functions of the access network device, and the DU implements a part of functions of the access network device. For example, the CU is responsible for processing a non-real-time protocol and service, and implements functions of an RRC layer and a packet data convergence protocol (PDCP) layer. The DU is responsible for processing a physical layer protocol and a real-time service, and implements functions of a radio link control (RLC) layer, a media access control (MAC) layer, and a physical (physical, PHY) layer. The AAU implements a part of physical layer processing functions, radio frequency processing, and a function related to an active antenna. Information at the RRC layer eventually becomes information at the PHY layer, or is converted from the information at the PHY layer. Therefore, in this architecture, higher layer signaling, for example, RRC layer signaling or PDCP layer signaling, may also be considered as being sent by the DU or sent by the DU and the AAU. In addition, the CU may be classified as a network device in a RAN, or the CU may be classified as a network device in a core network (CN). This is not limited herein.

Embodiment 1

Embodiment 1 is applicable to the network architecture shown in FIG. 7.

Figure 8:
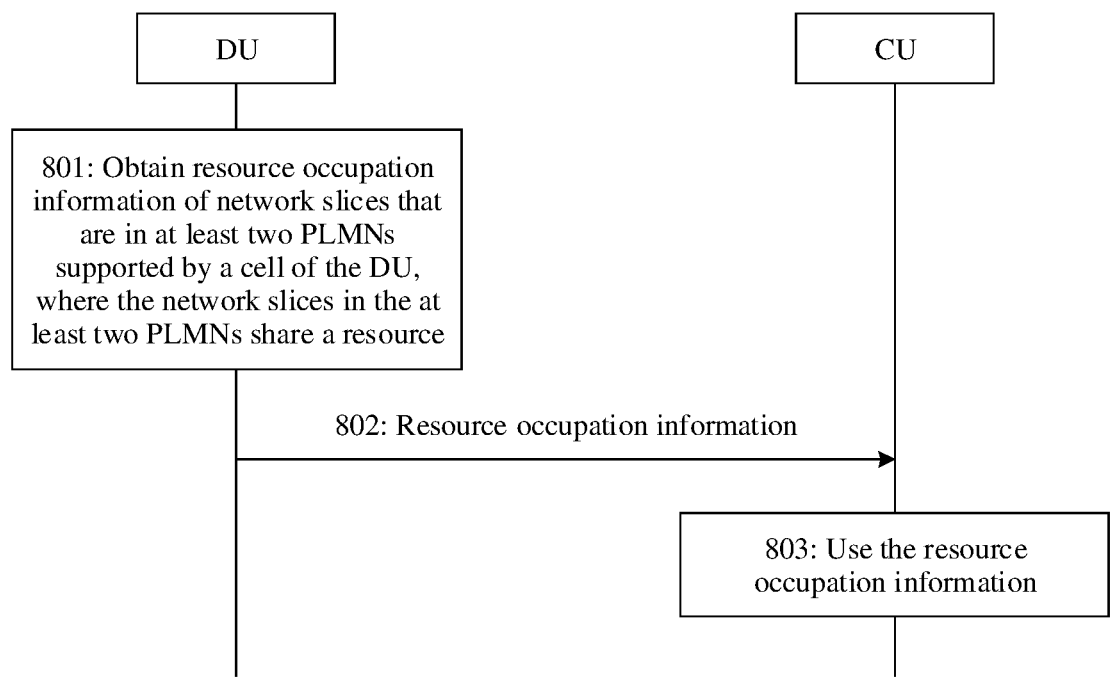
FIG. 8 is a flowchart of a communication method according to an embodiment of this application.

Embodiment 1 provides a communication method. The communication method may be applied to a RAN sharing scenario, and is used to perform access control on a terminal based on a network slice, to implement resource leveling for a same network slice in different PLMNs. Refer to FIG. 8. The communication method includes the following steps.

801 a DU obtains resource occupation information of network slices that are in at least two PLMNs supported by a cell of the DU, where the network slices in the at least two PLMNs share a resource.

The cell of the DU may be any cell covered by the DU. This is not limited in this application.

Resource occupation information of a network slice may be a resource occupation rate of the network slice, or may be a quantity of resources occupied by the network slice, or may be an indication indicating whether a resource of the network slice is overloaded. Whether a resource of network slice is overloaded may be determined based on a resource occupation rate of the network slice and/or a quantity of resources occupied by the network slice. For example, when a resource occupation rate of a network slice is greater than or equal to a threshold (denoted as a threshold 1), and/or a quantity of resources occupied by the network slice is greater than or equal to a threshold (denoted as a threshold 2), it is considered that a resource of the network slice is overloaded. The threshold 1 and the threshold 2 may be preset, predefined, specified in a protocol, or determined by an access network device and the terminal through negotiation. This is not limited in this application.

That a plurality of network slices share a resource means that the plurality of network slices all can use the resource. However, once a part of the resource is used by one network slice, another network slice can no longer use the part of the resource, and can only use another part of resource in the resource. The resource shared by the network slices that are in the at least two PLMNs includes any one or more of the following resources a hardware resource of the DU (including a storage resource of the DU and/or a computing resource of the DU), a hardware resource of a CU (including a storage resource of the CU and/or a computing resource of the CU), and a spectrum resource of the cell.

802 the DU sends the resource occupation information to the CU, and correspondingly, the CU receives the resource occupation information from the DU.

Optionally, the resource occupation information may be carried in a gNB-DU status indication (gNB-DU status indication) message.

When the DU reports the resource occupation information to the CU, one network slice may correspond to one piece of resource occupation information.

For example, resource occupation information of a network slice is a resource occupation rate of the network slice. If the cell supports two PLMNs a PLMN 1 and a PLMN 2, the PLMN 1 supports two network slices a network slice 1 and a network slice 2, and the PLMN 2 supports three network slices the network slice 1, the network slice 2, and a network slice 3, a resource occupation rate of the network slice 1 in the PLMN 1 is 0.15, a resource occupation rate of the network slice 2 in the PLMN 1 is 0.08, a resource occupation rate of the network slice 1 in the PLMN 2 is 0.1, a resource occupation rate of the network slice 2 in the PLMN 2 is 0.1, and a resource occupation rate of the network slice 3 in the PLMN 2 is 0.05, the resource occupation information reported by the DU to the CU may be shown in Table 1 or Table 2.

TABLE 1

| PLMN | Network slice | Resource occupation rate |
|---|---|---|
| PLMN 1 | Network slice 1 | 0.15 |
| | Network slice 2 | 0.08 |
| PLMN 2 | Network slice 1 | 0.1 |
| | Network slice 2 | 0.1 |
| | Network slice 3 | 0.05 |

TABLE 2

| Network slice | PLMN | Resource occupation rate |
|---|---|---|
| Network slice 1 | PLMN 1 | 0.15 |
| | PLMN 2 | 0.1 |
| Network slice 2 | PLMN 1 | 0.08 |
| | PLMN 2 | 0.1 |
| Network slice 3 | PLMN 2 | 0.05 |

When the DU reports the resource occupation information to the CU, a plurality of network slices may correspond to one piece of resource occupation information. For example, for a plurality of network slices with same resource occupation information, the plurality of network slices correspond to one piece of resource occupation information. In this case, the information in Table 1 and Table 2 may be reported in a form in Table 3 or Table 4.

TABLE 3

| PLMN | Network slice | Resource occupation rate |
|---|---|---|
| PLMN 1 | Network slice 1 | 0.15 |
| | Network slice 2 | 0.08 |
| PLMN 2 | Network slice 1 | 0.1 |
| | Network slice 2 | |
| | Network slice 3 | 0.05 |

TABLE 4

| Network slice | PLMN | Resource occupation rate |
|---|---|---|
| Network slice 1 | PLMN 1 | 0.15 |
| | PLMN 2 | 0.1 |
| Network slice 2 | PLMN 2 | |
| | PLMN 1 | 0.08 |
| Network slice 3 | PLMN 2 | 0.05 |

803 the CU uses the resource occupation information.

During specific implementation of step 803, the CU may perform, based on the resource occupation information, access control on one or more network slices that are in the at least two PLMNs. For example, if the terminal needs to access a network slice that is in a PLMN, the CU may determine, based on the resource occupation information, whether the terminal is allowed to access the network slice that is in the PLMN.

In the RAN sharing scenario, if there are a plurality of PLMNs of one cell, resource allocation for a same network slice in different PLMNs may be unleveled. For example, a PLMN 1 and a PLMN 2 share a RAN resource, network slices that can be provided by the PLMN 1 include a network slice 1 and a network slice 2, and network slices that can be provided by the PLMN 2 include the network slice 1, the network slice 2, and a network slice 3. When the terminal initiates a service request for the network slice 1 to a network, both the PLMN 1 and the PLMN 2 can provide services for the terminal. However, the terminal does not select, based on a current resource occupation status of the network slice 1, a PLMN to serve the terminal, but selects a PLMN based only on prior information of the PLMN and a signal strength of the cell. This may cause unleveled resource allocation for the network slice 1 in the PLMN 1 and the PLMN 2 (for example, the network slice 1 of a major operator has a larger quantity of users). According to the method provided in this embodiment of this application, when the access network device is in a form in which the DU and the CU are separated, the DU may send resource occupation information of network slices that are in PLMNs of the cell to the CU, so that the CU can use the resource occupation information to implement resource leveling. This avoids unleveled resource allocation for a same network slice in different PLMNs.

Figure 8A:
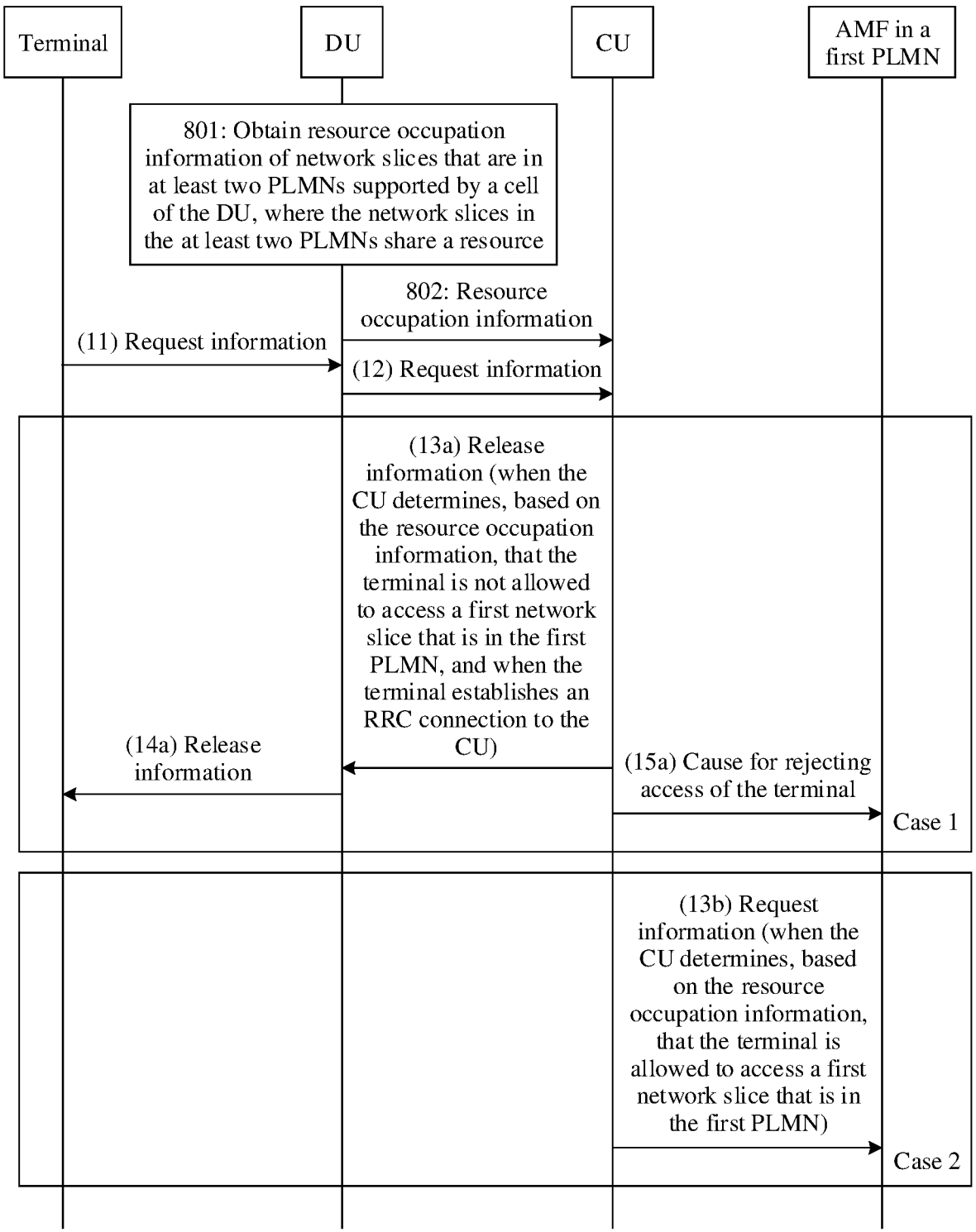
FIG. 8A is a flowchart of a communication method according to an embodiment of this application.

When a terminal in a cell expects to access a network slice (denoted as a first network slice, where the first network slice is any network slice in a first PLMN) in a PLMN (denoted as the first PLMN, where the first PLMN is any one of the at least two PLMNs), as shown in FIG. 8A, the method further includes step (11) and step (12).

(11) The terminal sends request information to the DU. Correspondingly, the DU receives the request information from the terminal.

The request information includes an identifier of the first PLMN and an identifier of the first network slice, and the request information is used by the terminal to request to access the first network slice that is in the first PLMN.

Step (11) and the foregoing step 802 are not performed in a particular order.

The request information between the terminal and the DU may be carried in an RRC setup complete (RRCSetupComplete) message.

(12) The DU sends the request information to the CU. Correspondingly, the CU receives the request information from the DU.

The request information between the DU and the CU may be carried in a gNB-DU status indication message.

After step (12), step 803 may be specifically implemented in the following two cases (denoted as Case 1 and Case 2).

Case 1

Refer to FIG. 8A. During specific implementation, step 803 may include the following step. (13a) The CU sends release information to the DU when the CU determines, based on the resource occupation information, that the terminal is not allowed to access the first network slice that is in the first PLMN, and when the terminal establishes an RRC connection to the CU, where the release information is used to indicate the terminal to release the RRC connection to the CU. Correspondingly, the DU receives the release information from the CU.

Optionally, the release information between the DU and the CU may be carried in a downlink RRC message transfer (DL RRC message transfer) message.

Optionally, the resource occupation information is used by the CU to determine whether the terminal is allowed to access the first network slice that is in the first PLMN.

Optionally, step (13a) may be specifically implemented in any one of the following Manner 1 to Manner 3.

Manner 1

The CU sends the release information to the DU when the CU determines, based on the resource occupation information, that a resource occupation rate of the first network slice in the first PLMN is greater than or equal to a threshold.

In Manner 1, the threshold may be preset, predefined, specified in a protocol, or determined by the access network device and the terminal through negotiation. This is not limited in this application. When the CU determines, based on the resource occupation information, that the resource occupation rate of the first network slice in the first PLMN is greater than or equal to the threshold, the CU does not allow the terminal to access the first network slice that is in the first PLMN. Therefore, the CU sends the release information to the DU.

In this embodiment of this application, a resource occupation rate of a network slice may be represented by using only a hardware resource occupation rate or a spectrum resource occupation rate of the network slice, or may be jointly represented by using the hardware resource occupation rate and the spectrum resource occupation rate. If the latter form is used, a weighted sum of the hardware resource occupation rate and the spectrum resource occupation rate may be used as the resource occupation rate of the network slice, an average value of the hardware resource occupation rate and the spectrum resource occupation rate may be used as the resource occupation rate of the network slice, or the resource occupation rate of the network slice may be obtained according to another calculation method. This is not limited in this application.

Similarly, the hardware resource occupation rate of the network slice may be represented by using only a storage resource occupation rate of the DU, a computing resource occupation rate of the DU, a storage resource occupation rate of the CU, or a computing resource occupation rate of the CU, or may be represented by using a plurality of items in the foregoing resource occupation rates. This is similar to the method for representing the resource occupation rate of the network slice. Details are not described again. This part of descriptions about the resource occupation rate of the network slice is applicable to another part of this embodiment, and is also applicable to another embodiment. Details are not described below again.

For example, based on any one of Table 1 to Table 4, if the first PLMN is the PLMN 1, the first network slice is the network slice 1, and the threshold is 0.12, because the resource occupation rate of the network slice 1 in the PLMN 1 is 0.15, and 0.15 is greater than 0.12, the CU sends the release information to the DU.

It should be noted that, if the CU determines, based on a resource occupation amount, whether to send the release information to the DU, the resource occupation rate in Manner 1 is replaced with the resource occupation amount.

Manner 2

The CU sends the release information to the DU when the CU determines, based on the resource occupation information, that the first network slice in the first PLMN is not a first network slice with a lowest resource occupation rate in first network slices that are in the at least two PLMNs.

When the CU determines, based on the resource occupation information, that the first network slice in the first PLMN is not the first network slice with the lowest resource occupation rate in the first network slices that are in the at least two PLMNs, the CU does not allow the terminal to access the first network slice that is in the first PLMN. Therefore, the CU sends the release information to the DU.

For example, based on any one of Table 1 to Table 4, if the first PLMN is the PLMN 1, and the first network slice is the network slice 1, because the resource occupation rate of the network slice 1 in the PLMN 1 is 0.15, the resource occupation rate of the network slice 1 in the PLMN 2 is 0.1, and 0.15 is not the smaller one of 0.1 and 0.15, the CU sends the release information to the DU.

It should be noted that, if the CU determines, based on a resource occupation amount, whether to send the release information to the DU, the resource occupation rate in Manner 2 is replaced with the resource occupation amount.

Manner 3

The CU sends the release information to the DU when the CU determines, based on the resource occupation information, that a resource of the first network slice in the first PLMN is overloaded.

When the CU determines, based on the resource occupation information, that the resource of the first network slice in the first PLMN is overloaded, the CU does not allow the terminal to access the first network slice that is in the first PLMN. Therefore, the CU sends the release information to the DU.

For example, the cell supports two PLMNs a PLMN 1 and a PLMN 2, the PLMN 1 supports two network slices a network slice 1 and a network slice 2, and the PLMN 2 supports three network slices the network slice 1, the network slice 2, and a network slice 3. For resource occupation information of the network slices, refer to Table 5, Table 6, Table 7, or Table 8. If the first PLMN is the PLMN 1, and the first network slice is the network slice 1, because a resource of the network slice 1 in the PLMN 1 is overloaded, the CU sends the release information to the DU.

TABLE 5

| PLMN | Network slice | Resource occupation information |
|---|---|---|
| PLMN 1 | Network slice 1 | Overloaded |
|  | Network slice 2 | Not overloaded |
| PLMN 2 | Network slice 1 | Not overloaded |
|  | Network slice 2 | Not overloaded |
|  | Network slice 3 | Not overloaded |

TABLE 6

| Network slice | PLMN | Resource occupation information |
|---|---|---|
| Network slice 1 | PLMN 1 | Overloaded |
|  | PLMN 2 | Not overloaded |
| Network slice 2 | PLMN 1 | Not overloaded |
|  | PLMN 2 | Not overloaded |
| Network slice 3 | PLMN 2 | Not overloaded |

TABLE 7

| PLMN | Network slice | Resource occupation information |
|---|---|---|
| PLMN 1 | Network slice 1 | Overloaded |
|  | Network slice 2 | Not overloaded |
| PLMN 2 | Network slice 1 |  |
|  | Network slice 2 |  |
|  | Network slice 3 |  |

TABLE 8

| Network slice | PLMN | Resource occupation information |
|---|---|---|
| Network slice 1 | PLMN 1 | Overloaded |
| | PLMN 2 | Not overloaded |
| Network slice 2 | PLMN 1 | |
| | PLMN 2 | |
| Network slice 3 | PLMN 2 | |

Optionally, the release information includes a release cause, and the release cause includes that the resource of the first network slice in the first PLMN is insufficient.

After step (13a), as shown in FIG. 8A, the method may further include step (14a).

(14a) The DU sends the release information to the terminal. Correspondingly, the terminal receives the release information from the DU. The terminal may release the RRC connection to the CU based on the release information.

Optionally, the release information between the terminal and the DU may be carried in an RRC release (RRC release) message.

Optionally, after step (13a), as shown in FIG. 8A, the method further includes step (15a).

(15a) The CU sends, to an AMF in the first PLMN, a cause for rejecting access of the terminal, where the cause includes that the resource of the first network slice in the first PLMN is insufficient.

Step (14a) and step (15a) are not performed in a particular order.

Case 2

Refer to FIG. 8A. During specific implementation, step 803 may include the following step. (13b) When the CU determines, based on the resource occupation information, that the terminal is allowed to access the first network slice that is in the first PLMN, the CU sends the request information to an AMF that is in the first PLMN.

Optionally, when the CU determines, based on the resource occupation information, that a resource occupation rate (or a resource occupation amount) of the first network slice in the first PLMN is less than a threshold, when the CU determines, based on the resource occupation information, that the first network slice in the first PLMN is a first network slice with a lowest resource occupation rate (or resource occupation amount) in first network slices that are in the at least two PLMNs, or when the CU determines, based on the resource occupation information, that a resource of the first network slice in the first PLMN is not overloaded, the CU sends the request information to a core network device that is in the first PLMN.

Figure 9:
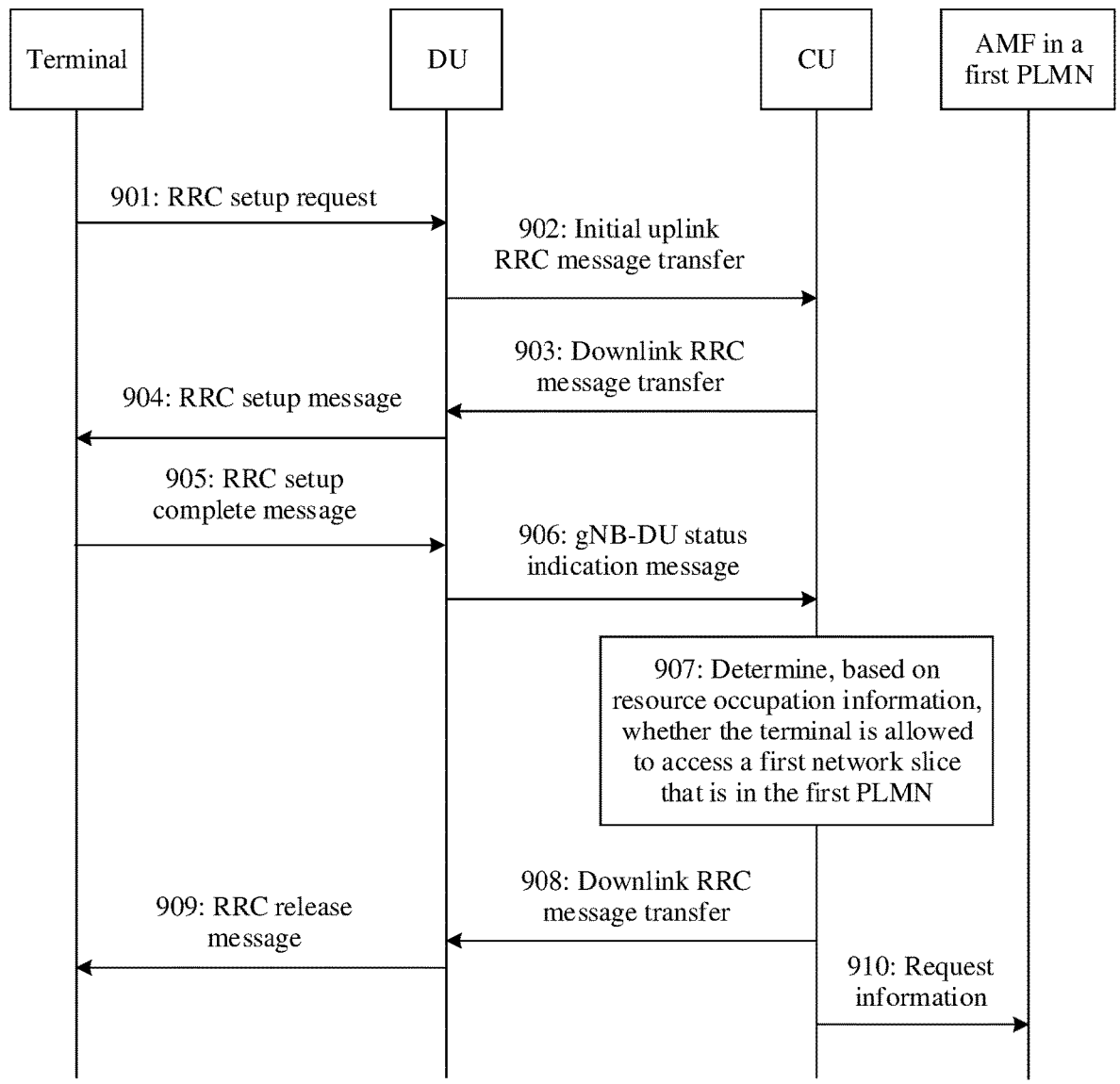
FIG. 9 to FIG. 11 each are a flowchart of a communication method according to an embodiment of this application.

To clarify the method provided in Embodiment 1, the following describes the method provided in Embodiment 1 by using FIG. 9 as an example. A process shown in FIG. 9 includes the following steps.

901 a terminal sends an RRC setup request (RRCSetupRequest) to a DU in a cell of the DU.

902 the DU sends an initial uplink RRC message transfer (initial UL RRC message transfer) to a CU.

903 the CU sends a downlink RRC message transfer (DL RRC message transfer) message to the DU.

904 the DU sends an RRC setup (RRC Setup) message to the terminal.

Step 901 to step 904 are a random access procedure of the terminal, and are used by the terminal to establish an RRC connection to the CU.

905 the terminal sends an RRC setup complete (RRCSetupComplete) message to the DU.

The RRC setup complete message includes request information, the request information includes an identifier of a first PLMN and an identifier of a first network slice, and the request information may be used by the terminal to request to access the first network slice that is in the first PLMN.

906 the DU sends a gNB-DU status indication message to the CU.

The gNB-DU status indication message may carry resource occupation information of network slices that are in at least two PLMNs of the cell. For example, an information element PLMN resource occupation list (PLMN Resource Occupation List) is added to the gNB-DU status indication message to carry the resource occupation information.

It should be noted that there is no mandatory requirement on a transmission sequence of the resource occupation information and other information exchanged between the DU and the CU, and the DU may send the resource occupation information to the CU at any time.

907 the CU determines, based on the resource occupation information, whether the terminal is allowed to access the first network slice that is in the first PLMN.

For specific implementation of step 907, refer to the foregoing Manner 1 to Manner 3. Details are not described herein again.

If the terminal is allowed, step 908 and step 909 are performed after step 907. If the terminal is not allowed, step 910 is performed after step 907.

908. The CU sends a downlink RRC message transfer message to the DU.

The downlink RRC message transfer message includes release information, and the release information is used to indicate the terminal to release the RRC connection to the CU.

Optionally, the method further includes the CU releases the RRC connection to the terminal.

909 the DU sends an RRC release message to the terminal.

The RRC release message includes the release information.

910 the CU sends request information to an AMF that is in the first PLMN.

For a subsequent procedure after step 910, refer to a conventional technology, and details are not described herein.

In the method provided in Embodiment 1, after the terminal establishes the RRC connection to the CU, the DU and the CU may obtain, through interaction, the resource occupation information of the network slices that are in the at least two PLMNs of the current cell, to control access of the terminal. In this way, leveled resource allocation for a same network slice in different PLMNs is implemented.

Embodiment 2

Embodiment 2 is applicable to the network architectures shown in FIG. 6 and FIG. 7, and certainly may also be applicable to another network architecture. In FIG. 7, a CU and one or more DUs connected to the CU form an access network device in Embodiment 2. During specific implementation, an action performed by the access network device may be cooperatively performed by the CU and the DU (for example, the CU and the DU may exchange resource occupation information, for a specific process, refer to Embodiment 1). In this case, a cell in Embodiment 2 is a cell covered by one DU connected to the CU.

Figure 10:
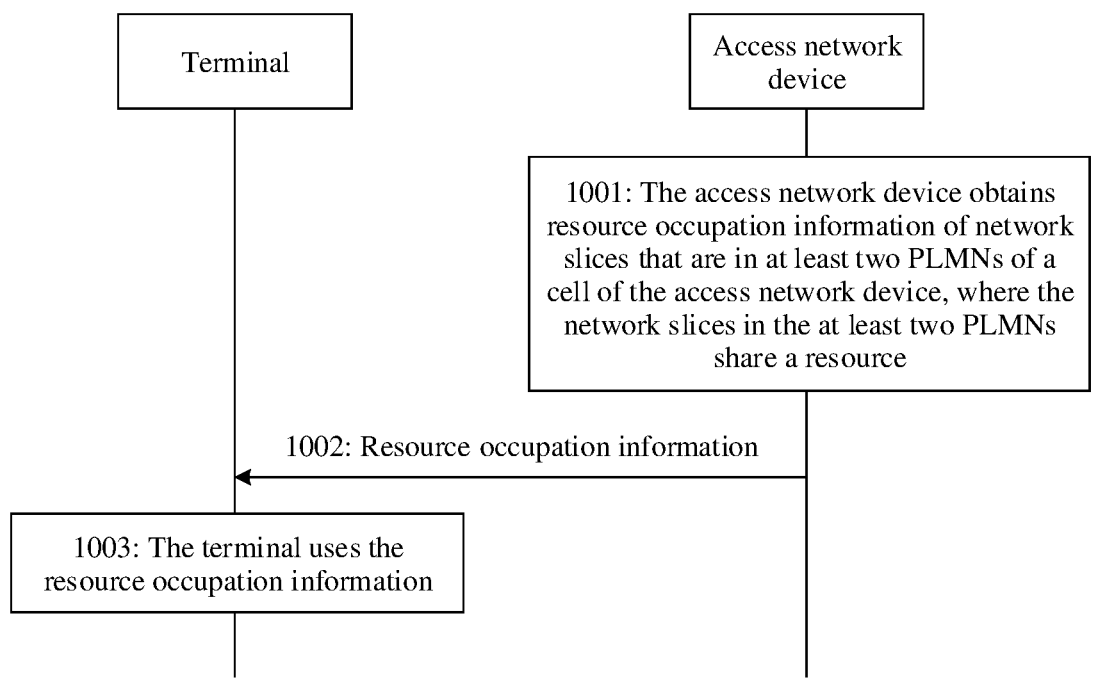

Embodiment 2 provides a communication method that may be applied to a RAN sharing scenario. The access network device sends, to a terminal, resource occupation information of network slices that are in at least two PLMNs of the cell of the access network device, so that the terminal can select a PLMN based on the resource occupation information of the network slices. In this way, leveled resource allocation for a same network slice in different PLMNs is implemented. Refer to FIG. 10. The communication method includes the following steps.

1001 the access network device obtains the resource occupation information of the network slices that are in the at least two PLMNs of the cell of the access network device, where the network slices in the at least two PLMNs share a resource.

Step 1001 is an optional step.

The cell of the access network device may be any cell covered by the access network device. This is not limited in this application.

For descriptions of the resource occupation information of the network slice and resource sharing by a plurality of network slices, refer to Embodiment 1. Details are not described again in Embodiment 2. A difference from Embodiment 1 in that, the resource shared by the network slices that are in the at least two PLMNs herein includes any one or more of the following resources a hardware resource of the access network device (including a storage resource of the access network device and/or a computing resource of the access network device) and a spectrum resource of the cell.

1002 the access network device sends the resource occupation information to the terminal. Correspondingly, the terminal receives the resource occupation information from the access network device.

During specific implementation of step 1002, the access network device may send, to the terminal, an RRC message including the resource occupation information, or may broadcast system information including the resource occupation information. After receiving the system information, the terminal may decode the system information to obtain the resource occupation information.

The system information may be any piece of system information in existing system information, or may be any piece of system information in future evolved system information. This is not limited in this application. For example, the resource occupation information may be added to a cell access related information (cellAccessRelatedInfo) information element that is in an SIB1.

When the access network device sends the resource occupation information to the terminal, one network slice may correspond to one piece of resource occupation information, as shown in the example in Table 1, Table 2, Table 5, or Table 6. Alternatively, a plurality of network slices may correspond to one piece of resource occupation information, as shown in the example in Table 3, Table 4, Table 7, or Table 8.

1003 the terminal uses the resource occupation information.

During specific implementation of step 1003, the terminal may determine, based on the resource occupation information, whether to request to access a network slice that is in a PLMN.

According to the method provided in this embodiment of this application, the access network device may send, to the terminal, the resource occupation information of the network slices that are in at least two PLMNs of the cell of the access network device, and the terminal may use the resource occupation information, to implement resource leveling. For example, currently, the system information does not include resource occupation information of network slices that are in PLMNs of the cell, and cannot provide reference information for the terminal to select a PLMN and request a corresponding network slice service. This may cause unleveled resource allocation for a same network slice in different PLMNs. In this embodiment of this application, the resource occupation information may be added to the system information, to provide a reference information for the terminal to select a PLMN and request a corresponding network slice service, to avoid unleveled resource allocation for a same network slice in different PLMNs.

Optionally, during specific implementation, step 1003 includes the following step.

1003*a* the terminal sends request information to the access network device based on the resource occupation information, where the request information includes an identifier of a first PLMN and an identifier of a first network slice, and the request information is used to request to access the first network slice that is in the first PLMN.

Optionally, the request information may be carried in a message 5.

Optionally, during specific implementation, step 1003*a* includes the following steps.

(1003*a*-1) The terminal selects the first PLMN based on the resource occupation information.

(1003*a*-2) The terminal sends the request information to the access network device.

Before step (1003*a*-2), the terminal may further select the first network slice. Specifically, selection may be performed based on a service requirement of the terminal.

After step 1003*a*, the access network device receives the message carrying the request information (for example, the request information may be carried in a message header of the message), determines, based on the message, that a PLMN that the terminal requests to access is the first PLMN, and sends the message to a core network device that is in the first PLMN. After receiving the message, the core network device determines whether access of the terminal is allowed, and sends an access accept message or an access reject message to the terminal. For an example procedure, refer to FIG. ii. The procedure includes the following steps.

1101 an access network device sends system information to a terminal, where the system information includes resource occupation information.

1102 the terminal decodes the system information to obtain the resource occupation information.

1103 the terminal selects a first network slice and a first PLMN based on the resource occupation information.

1104 the terminal sends, to the access network device, a message carrying request information.

1105 the access network device determines, based on the message carrying the request information, that a PLMN that the terminal requests to access is the first PLMN.

1106 the access network device sends, to a core network device (for example, an AMF) in the first PLMN, the message carrying the request information.

1107 the core network device in the first PLMN determines whether access of the terminal is allowed.

1108 the core network device in the first PLMN sends an access accept message or an access reject message to the terminal.

It may be understood that when the core network device in the first PLMN determines that the terminal is allowed to access the first network slice that is in the first PLMN, the core network device in the first PLMN sends the access accept message to the terminal. Otherwise, the core network device in the first PLMN sends the access reject message to the terminal.

Step (1003*a*-1) may be implemented in the following Manner 1 or Manner 2.

Manner 1

Figure 11:
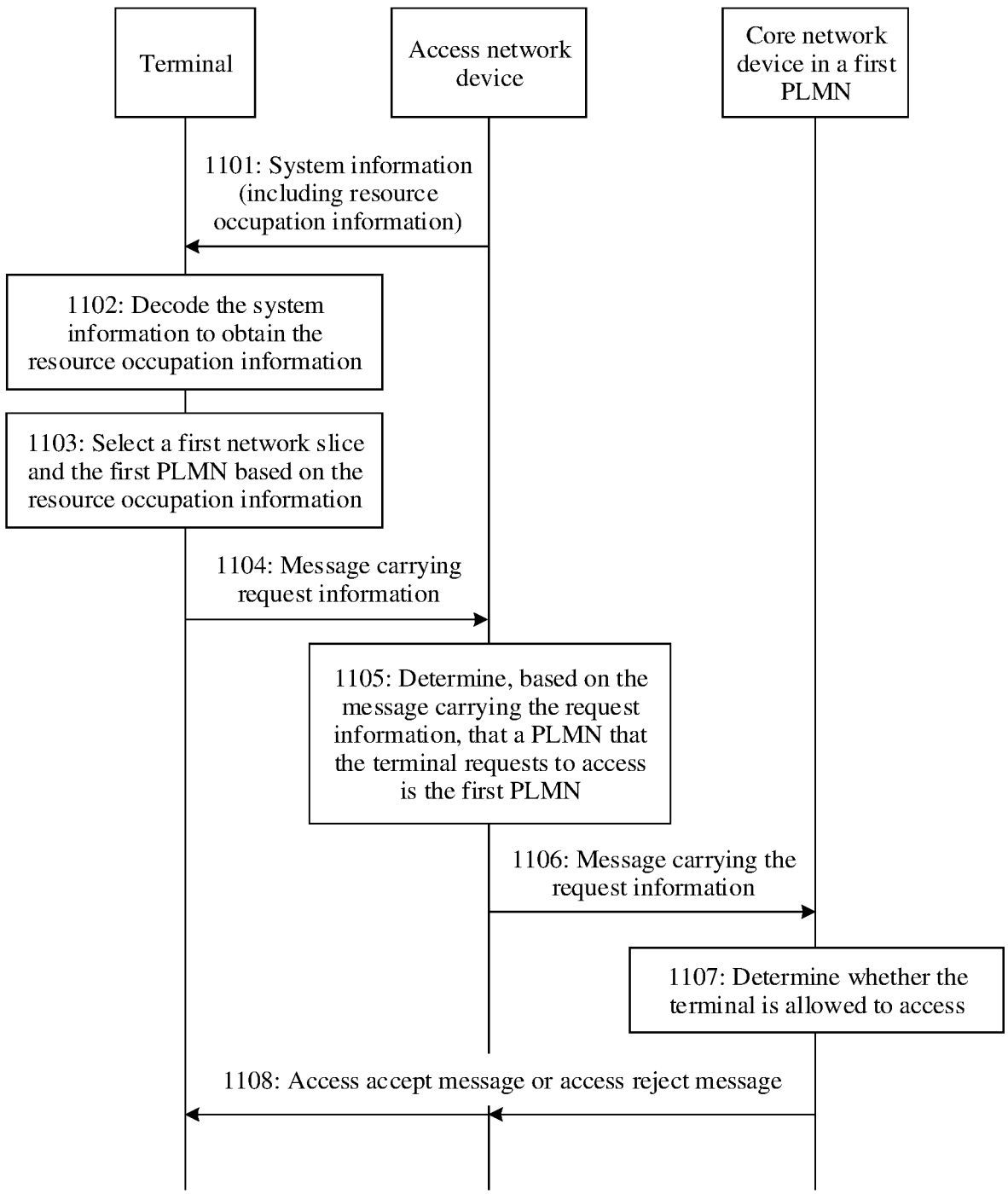
Figure 11A:
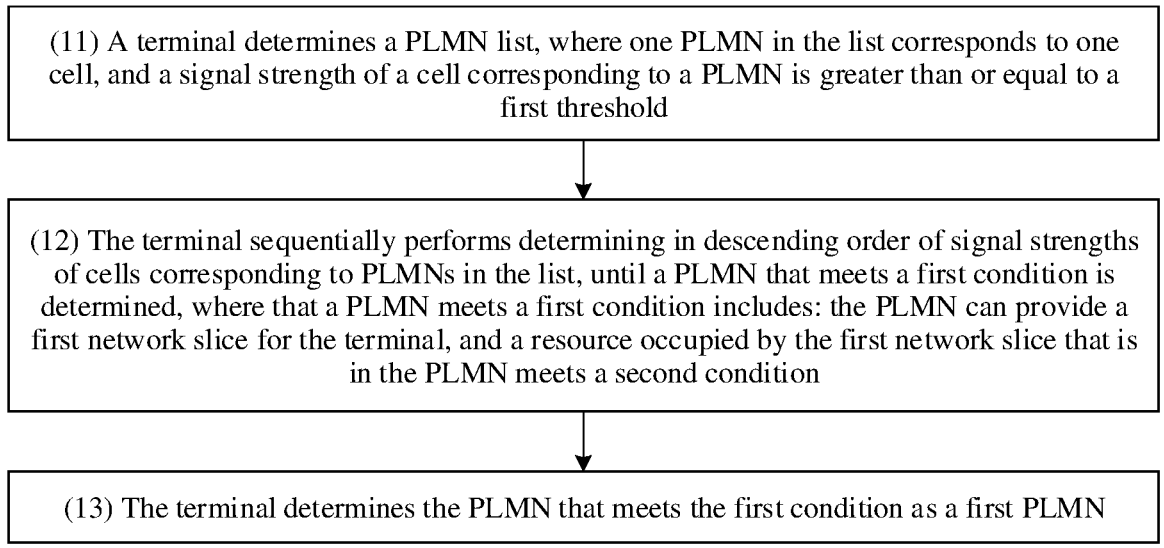
FIG. 11A is a flowchart of PLMN selection according to an embodiment of this application.

Refer to FIG. 11A. Manner 1 includes step (11) to step (13).

(11) A terminal determines a PLMN list, where one PLMN in the list corresponds to one cell, and a signal strength of a cell corresponding to a PLMN is greater than or equal to a first threshold.

It should be noted that one PLMN corresponds to one cell, but one cell may correspond to a plurality of PLMNs.

The first threshold may be preset, predefined, specified in a protocol, or determined by an access network device and the terminal through negotiation. This is not limited in this application.

(12) The terminal sequentially performs determining in descending order of signal strengths of cells corresponding to PLMNs in the list, until a PLMN that meets a first condition is determined, where that a PLMN meets a first condition includes the PLMN can provide a first network slice for the terminal, and a resource occupied by the first network slice that is in the PLMN meets a second condition.

During specific implementation of step (12), the terminal may sequentially sort the PLMNs in descending order of the signal strengths of the cells corresponding to the PLMNs in the list, and then sequentially determine, in descending order of sorting results, whether the PLMNs meet the first condition.

Optionally, that a resource occupied by the first network slice that is in the PLMN meets a second condition includes a resource occupation rate of the first network slice in the PLMN is less than or equal to a second threshold, a quantity of resources occupied by the first network slice that is in the PLMN is less than or equal to a third threshold, or a resource of the first network slice in the PLMN is not overloaded.

The second threshold and/or the third threshold may be preset, predefined, specified in a protocol, or determined by the access network device and the terminal through negotiation. This is not limited in this application.

(13) The terminal determines the PLMN that meets the first condition as a first PLMN.

For example, if the PLMN list includes three PLMNs a PLMN 1, a PLMN 2, and a PLMN 3, the three PLMNs can each provide a first network slice, resource occupation rates corresponding to first network slices that are in the PLMN 1, the PLMN 2, and the PLMN 3 are 0.2, 0.15, and 0.3, the three PLMNs are sorted as the PLMN 3, the PLMN 2, and the PLMN 1 in descending order of signal strengths of cells corresponding to the PLMNs, and the second threshold is 0.2, the terminal may first determine whether a resource occupation rate corresponding to the first network slice that is in the PLMN 3 is less than or equal to 0.2. If a result is no, the terminal does not select the PLMN 3 as the first PLMN, and then the terminal determines whether a resource occupation rate corresponding to the first network slice that is in the PLMN 2 is less than or equal to 0.2. If a result is yes, the terminal determines the PLMN 2 as the first PLMN.

Figure 12:
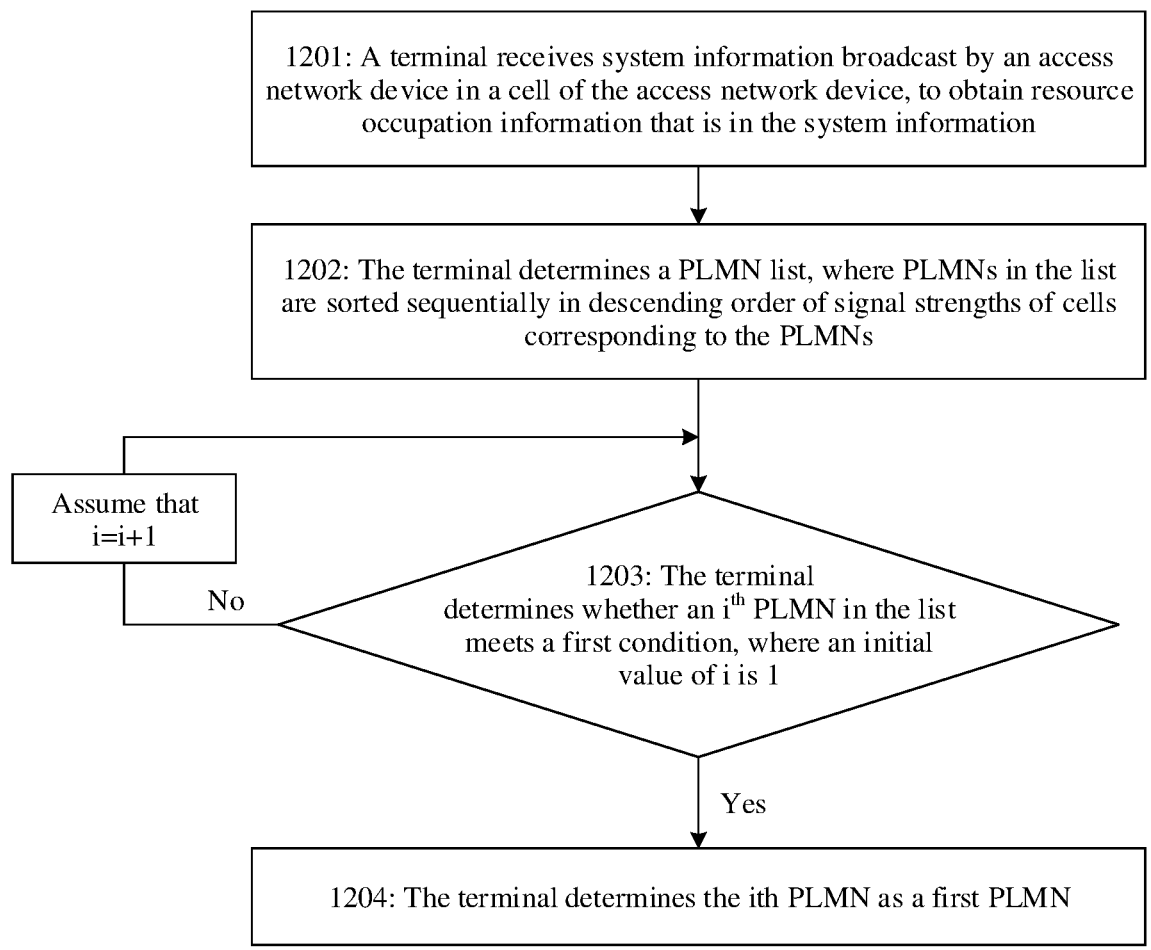
FIG. 12 and FIG. 13 each are a flowchart of PLMN selection according to an embodiment of this application.

Based on Manner 1, for an example of a procedure in which the terminal performs PLMN selection, refer to FIG. 12. The procedure includes the following steps.

1201 a terminal receives system information broadcast by an access network device in a cell of the access network device, to obtain resource occupation information that is in the system information.

1202 the terminal determines a PLMN list, where PLMNs in the list are sorted sequentially in descending order of signal strengths of cells corresponding to the PLMNs.

1203 the terminal determines whether an $i^{th}$ PLMN in the list meets a first condition, where an initial value of i is 1.

If the first condition is met, perform step 1204. If the first condition is not met, assume that i=i+1, and go back to step 1203.

1204 the terminal determines the $i^{th}$ PLMN as a first PLMN.

Step 1201 may be performed simultaneously with the step "read system information to obtain a PLMN ID" in FIG. 2, and step 1202 to step 1204 in FIG. 12 may be performed after the step "the NAS stratum indicates to stop PLMN search" in FIG. 2.

Method 1 is applicable to PLMN selection without prior information.

Manner 2

Figure 11B:
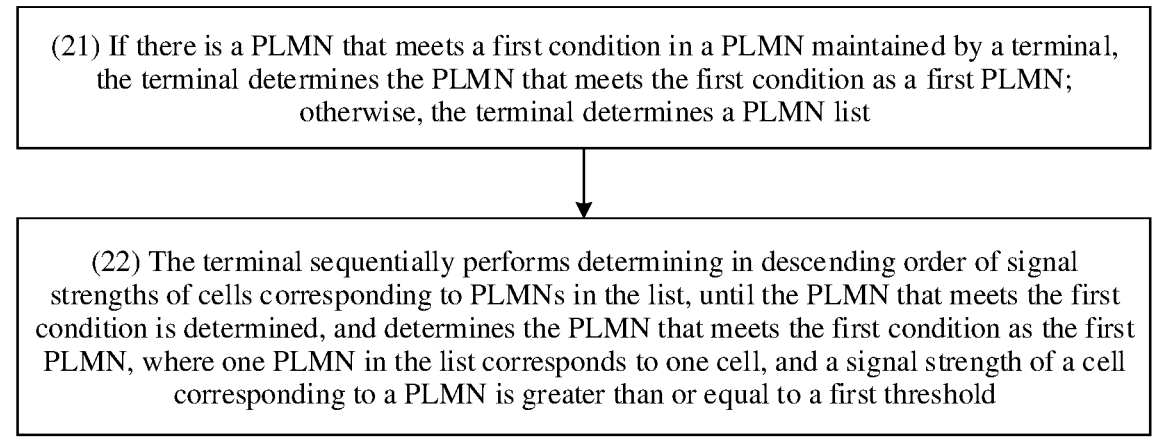
FIG. 11B is a flowchart of PLMN selection according to an embodiment of this application.

Refer to FIG. 11B. Manner 2 includes step (21) and step (22).

(21) If there is a PLMN that meets a first condition in a PLMN maintained by a terminal, the terminal determines the PLMN that meets the first condition as a first PLMN, otherwise, the terminal determines a PLMN list.

(22) The terminal sequentially performs determining in descending order of signal strengths of cells corresponding to PLMNs in the list, until the PLMN that meets the first condition is determined, and determines the PLMN that meets the first condition as the first PLMN, where one PLMN in the list corresponds to one cell, and a signal strength of a cell corresponding to a PLMN is greater than or equal to a first threshold.

That a PLMN meets a first condition includes the PLMN can provide a first network slice for the terminal, and a resource occupied by the first network slice that is in the PLMN meets a second condition. For descriptions of this part, refer to Manner 1. Details are not described again.

The PLMN maintained by the terminal may be stored in the terminal. The PLMN maintained by the terminal includes one or more of an RPLMN, an EPLMN, an HPLMN, and an EHPLMN. When determining whether there is the PLMN that meets the first condition in the PLMN maintained by the terminal, the terminal also performs determining in a sequence of the RPLMN, the EPLMN, the HPLMN, and the EHPLMN. For example, if the PLMN maintained by the terminal includes the RPLMN and the HPLMN, when determining whether there is the PLMN that meets the first condition in the PLMN maintained by the terminal, the terminal first determines whether the RPLMN meets the first condition, and then determines whether the HPLMN meets the first condition.

The RPLMN refers to a registered PLMN (Registered PLMN), that is, a PLMN with which the terminal successfully registers last time, and a PLMN ID of the RPLMN is stored in a memory of the terminal. The EPLMN refers to an equivalent PLMN (Equivalent PLMN), that is, an equivalent PLMN of a currently selected PLMN, namely, an equivalent PLMN of an RPLMN. A PLMN ID of the EPLMN is stored in the memory of the terminal. The HPLMN refers to a home PLMN (Home PLMN), that is, a home PLMN of a USIM card, and indicates a PLMN corresponding to the USIM card. A PLMN ID of the home PLMN is obtained from an international mobile subscriber identity (international mobile subscriber identity, IMSI) number of the USIM card (where first several digits of the IMSI number are the home PLMN ID). The EHPLMN is an equivalent home PLMN (Equivalent Home PLMN), that is, an equivalent PLMN of a home PLMN of a USIM card, namely, a PLMN equivalently used as the home PLMN. PLMN IDs of EHPLMNs are stored in an "EHPLMN List" table in the USIM card, and are arranged in descending order of priorities (a PLMN ID with the highest priority is placed in the first place), and the terminal performs PLMN selection in descending order of the priorities.

For example, if the PLMN maintained by the terminal includes the RPLMN and the HPLMN, the RPLMN and the HPLMN can each provide a first network slice, resource occupation rates corresponding to the first network slices that are in the RPLMN and the HPLMN are both 0.1, and a second threshold is 0.2, the terminal first determines whether the resource occupation rate corresponding to the first network slice that is in the RPLMN is less than or equal to 0.2, and a result is no. Then, the terminal determines whether the resource occupation rate corresponding to the first network slice that is in the HPLMN is less than or equal to 0.2, and a result is also no. In this case, the terminal determines the PLMN list. If the PLMN list includes a PLMN 1, a PLMN 2, and a PLMN 3, the PLMN 1, the PLMN 2, and the PLMN 3 can each provide a first network slice, resource occupation rates corresponding to the first network slices that are in the PLMN 1, the PLMN 2, and the PLMN 3 are 0.2, 0.15, and 0.3, and the PLMNs are sorted as the PLMN 3, the PLMN 2, and the PLMN 1 in descending order of signal strengths of cells corresponding to the PLMN list, the terminal determines whether the resource occupation rate corresponding to the first network slice that is in the PLMN 3 is less than or equal to 0.2, and a result is also no. Then, the terminal determines whether the resource occupation rate corresponding to the first network slice that is in the PLMN 2 is less than or equal to 0.2, and a result is yes, so that the terminal determines the PLMN 2 as the first PLMN.

Figure 13:
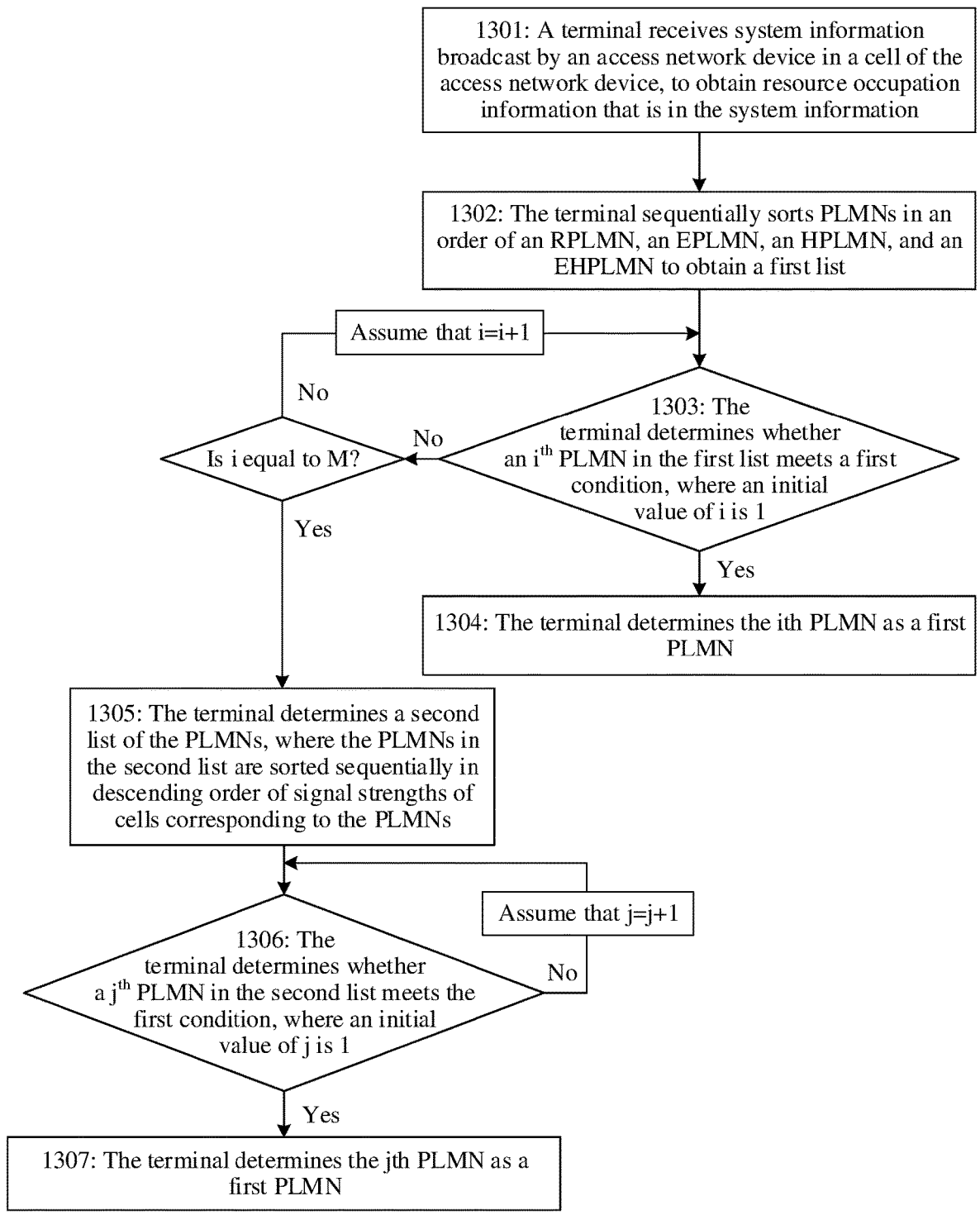

Based on Manner 2, assuming that the PLMN maintained by the terminal includes the RPLMN, the EPLMN, the HPLMN, and the EHPLMN, for a PLMN selection procedure performed by the terminal, refer to FIG. 13. The procedure includes the following steps.

1301 a terminal receives system information broadcast by an access network device in a cell of the access network device, to obtain resource occupation information that is in the system information.

1302 the terminal sequentially sorts PLMNs in an order of an RPLMN, an EPLMN, an HPLMN, and an EHPLMN to obtain a first list.

The EPLMN may include a plurality of PLMNs, and the EHPLMN may also include a plurality of PLMNs. In this embodiment of this application, it is assumed that there are M PLMNs in the first list.

1303 the terminal determines whether an $i^{th}$ PLMN in the first list meets a first condition, where an initial value of i is 1.

If the first condition is met, perform step 1304. If the first condition is not met, determine whether i is equal to M. If i is equal to M, perform step 1305. If i is not equal to M, assume that i=i+1, and go back to step 1303.

1304 the terminal determines the $i^{th}$ PLMN as a first PLMN.

1305 the terminal determines a second list of the PLMNs, where the PLMNs in the second list are sorted sequentially in descending order of signal strengths of cells corresponding to the PLMNs.

One PLMN in the second list corresponds to one cell, and a signal strength of a cell corresponding to a PLMN is greater than or equal to a first threshold.

1306 the terminal determines whether a $j^{th}$ PLMN in the second list meets the first condition, where an initial value of j is 1.

If the first condition is met, perform step 1307. If the first condition is not met, assume that j=j+1, and go back to step 1306.

1307 the terminal determines the $j^{th}$ PLMN as the first PLMN.

Step 1301 may be performed simultaneously with the step "read system information to obtain a PLMN ID" in FIG. 3, and step 1302 to step 1307 in FIG. 13 may be performed after the step "the NAS stratum indicates to stop PLMN search" in FIG. 3.

Manner 2 is applicable to PLMN selection with prior information.

In this embodiment of this application, for example, in the foregoing Manner 1 and Manner 2, for the RAN sharing scenario, the terminal considers resource occupation information of network slices in PLMNs in addition to an existing PLMN selection rule, so that the terminal selects, as much as possible, a PLMN to which a network slice with smaller resource occupation belongs. In this way, resource leveling can be implemented.

Embodiment 3

Embodiment 3 is applicable to the network architectures shown in FIG. 6 and FIG. 7, and certainly may also be applicable to another network architecture. In FIG. 7, a CU and one or more DUs connected to the CU form an access network device in Embodiment 3. During specific implementation, an action performed by the access network device may be cooperatively performed by the CU and the DU (for example, the CU and the DU may exchange resource occupation information, for a specific process, refer to Embodiment 1). In this case, a cell in Embodiment 3 is a cell covered by one DU connected to the CU.

Figure 14:
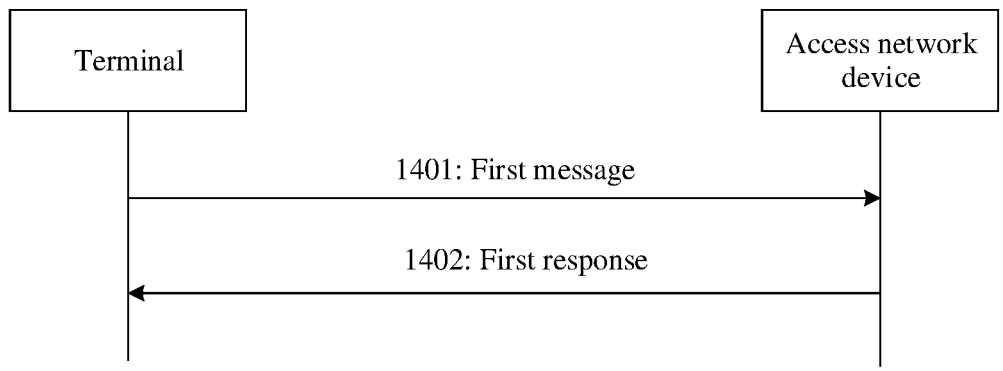
FIG. 14 is a flowchart of a communication method according to an embodiment of this application.

Embodiment 3 provides a communication method. A terminal indicates a requested PLMN and network slice based on a message in a random access procedure, to avoid the foregoing problem 3. In addition, Embodiment 3 may be further applied to a RAN sharing scenario. The access network device may perform access control on the terminal based on resource occupation information of network slices that are in at least two PLMNs of the cell, so that resource allocation for a same network slice in different PLMNs is leveled. Refer to FIG. 14. The communication method includes the following steps.

1401 the terminal sends a first message to the access network device in the cell of the access network device. Correspondingly, the access network device receives the first message from the terminal in the cell of the access network device.

The first message is a message in a random access procedure. Optionally, the first message is a message 1, a message 3, or a message A.

The first message can indicate a first PLMN and/or a first network slice, where the first PLMN is a PLMN that the terminal expects to access, and the first network slice is a network slice that the terminal expects to access.

The cell of the access network device may be any cell covered by the access network device. This is not limited in this application.

1402 the access network device sends a first response to the terminal. Correspondingly, the terminal receives the first response from the access network device.

The first response includes information about whether the terminal is allowed to access the first PLMN and/or the first network slice.

When the first message is a message 1, the first response is a message 2. When the first message is a message 3, the first response is a message 4. When the first message is a message A, the first response is a message B.

It should be noted that step 1402 is an optional step. In this case, if the terminal does not receive the first response from the access network device within a specific time period after sending the first message, it is considered that the terminal is not allowed to access the first PLMN and/or the first network slice.

Optionally, during specific implementation, step 1402 includes the following step.

1402*a* the access network device sends the first response to the terminal based on the resource occupation information of the network slices that are in the at least two PLMNs of the cell, where the network slices in the at least two PLMNs share a resource.

During specific implementation of step 1402*a*, the access network device may determine, in any one of Manner 1 to Manner 3 in Embodiment 1, whether the terminal is allowed to access the first PLMN and/or the first network slice, then include a determining result in the first response after performing determining, and send the first response to the terminal. In this way, leveled resource allocation for a same network slice in different PLMNs can be implemented. A difference only lies in that it is the access network device that performs determining herein, and the access network device determines whether the terminal is allowed to access the first PLMN, based on resource occupation information (for example, information, of the first PLMN, such as a resource occupation rate, a resource occupation amount, or whether a resource is overloaded) of the first PLMN.

For descriptions of the resource occupation information of the network slice and resource sharing by a plurality of network slices, refer to Embodiment 1. Details are not described again in Embodiment 3. A difference from Embodiment flies in that, the resource shared by the network slices that are in the at least two PLMNs herein includes any one or more of the following resources a hardware resource of the access network device (including a storage resource of the access network device and/or a computing resource of the access network device) and a spectrum resource of the cell.

Optionally, if the terminal is not allowed to access the first PLMN and/or the first network slice, the first response includes a rejection cause, and the rejection cause includes that a resource of the first PLMN and/or the first network slice is insufficient.

Currently, a terminal includes, in a subsequent message (for example, a message 5 (Msg 5)) after a random access procedure, an identifier of a PLMN and a network slice that the terminal requests to access. In this case, additional signaling overheads are caused when an access network device performs access control on the terminal. According to the method provided in Embodiment 3, the terminal may indicate, based on the message in the random access procedure, information about the PLMN that the terminal expects to access and information about the network slice that the terminal expects to access, so that the access network device can obtain the information earlier, and perform access control on the terminal based on some subsequent interaction messages, to reduce signaling overheads.

The first message may indicate the first PLMN and/or the first network slice in any one of the following Manner a to Manner d.

Manner a

In Manner a, a PLMN and/or a network slice are/is indicated by using a preamble set to which a preamble belongs.

In this case, the first message is a message 1 or a message A, the message 1 and the message A include a preamble, and a preamble set to which the preamble belongs corresponds to the first PLMN and/or the first network slice.

The preamble set includes one or more preambles. A preamble set is a preamble group.

It should be noted that in an existing communication protocol, there are 64 preambles, which are classified into two parts: one part is used for contention access, and the other part is used for non-contention access. Preambles used for contention access are further classified into a group A and a group B. When a size of a message 3 that needs to be transmitted by the terminal is small, group A (implicitly specifying that radio channel quality is poor) is selected. When a size of a message 3 that needs to be transmitted by the terminal is large, group B (implicitly specifying that radio channel quality is good) is selected.

In this embodiment of this application, when the preamble set to which the preamble belongs corresponds to the PLMN and the network slice, one network slice in one PLMN corresponds to one preamble set. For example, if the cell supports two PLMNs a PLMN 1 and a PLMN 2, the PLMN 1 supports two network slices a network slice 1 and a network slice 2, and the PLMN 2 supports three network slices the network slice 1, the network slice 2, and a network slice 3, for a preamble set corresponding to each network slice that is in each PLMN, refer to Table 9.

TABLE 9

| PLMN | Network slice | Preamble set |
|---|---|---|
| PLMN 1 | Network slice 1 | 1 |
|  | Network slice 2 | 2 |
| PLMN 2 | Network slice 1 | 3 |
|  | Network slice 2 | 4 |
|  | Network slice 3 | 5 |

When the preamble set to which the preamble belongs corresponds to the PLMN, one PLMN corresponds to one preamble set. For example, if the cell supports two PLMNs a PLMN 1 and a PLMN 2, for a preamble set corresponding to each PLMN, refer to Table 10.

TABLE 10

| PLMN | Preamble set |
|---|---|
| PLMN 1 | 1 |
| PLMN 2 | 3 |

When the preamble set to which the preamble belongs corresponds to the network slice, one network slice corresponds to one preamble set. For example, if network slices supported by the cell are a network slice 1, a network slice 2, and a network slice 3, for a preamble set corresponding to each network slice, refer to Table 11.

TABLE 11

| Network slice | Preamble set |
| --- | --- |
| Network slice 1 | 1 |
| Network slice 2 | 2 |
| Network slice 3 | 3 |

In this application, when preambles are grouped, detailed grouping may be further performed based on existing preamble grouping, where for example, when the preamble set to which a preamble belongs corresponds to the PLMN, preambles in group A are further divided based on a quantity of PLMNs, and each obtained preamble set corresponds to one PLMN. Alternatively, when preambles are grouped, re-division may be performed on all preambles, where for example, when the preamble set to which a preamble belongs corresponds to the PLMN, all preambles are further divided based on a quantity of PLMNs, and each obtained preamble set corresponds to one PLMN.

In Manner a, when the preamble set to which the preambles in the message 1 and the message A belong corresponds to only the first PLMN, the first network slice may be indicated in another manner. When the preamble set to which the preambles in the message 1 and the message A belong corresponds to only the first network slice, the first PLMN may be indicated in another manner.

Manner b

In Manner b, a PLMN and/or a network slice are/is indicated by using a preset identifier.

In this case, the first message is a message 3, the message 3 includes a preset identifier, and the preset identifier corresponds to the first PLMN and/or the first network slice.

It should be noted that, due to a limitation of a size (48 bits) of the message 3, the message 3 may carry the preset identifier, to indicate the PLMN and/or the network slice. A correspondence between the preset identifier and the PLMN and/or the network slice may be broadcast by the access network device to the terminal. The preset identifier may be allocated or preset by the access network device, or may be determined in another manner. This is not limited in this application.

In this embodiment of this application, when the preset identifier corresponds to the PLMN and the network slice, one network slice in one PLMN corresponds to one preset identifier. For example, if the cell supports two PLMNs a PLMN 1 and a PLMN 2, the PLMN 1 supports two network slices a network slice 1 and a network slice 2, and the PLMN 2 supports three network slices the network slice 1, the network slice 2, and a network slice 3, for a preset identifier corresponding to each network slice that is in each PLMN, refer to Table 12.

TABLE 12

| PLMN | Network slice | Preset identifier |
| --- | --- | --- |
| PLMN 1 | Network slice 1 | 1 |
|  | Network slice 2 | 2 |
| PLMN 2 | Network slice 1 | 3 |
|  | Network slice 2 | 4 |
|  | Network slice 3 | 5 |

When the preset identifier corresponds to the PLMN, one PLMN corresponds to one preset identifier. For example, if the cell supports two PLMNs a PLMN 1 and a PLMN 2, for a preset identifier corresponding to each PLMN, refer to Table 13.

TABLE 13

| PLMN | Preset identifier |
| --- | --- |
| PLMN 1 | 1 |
| PLMN 2 | 3 |

When the preset identifier corresponds to the network slice, one network slice corresponds to one preset identifier. For example, if network slices supported by the cell are a network slice 1, a network slice 2, and a network slice 3, for a preset identifier corresponding to each network slice, refer to Table 14.

TABLE 14

| Network slice | Preset identifier |
| --- | --- |
| Network slice 1 | 1 |
| Network slice 2 | 2 |
| Network slice 3 | 3 |

In Manner b, when the preset identifier in the message 3 corresponds to only the first PLMN, the first network slice may be indicated in another manner. When the preset identifier in the message 3 corresponds to only the first network slice, the first PLMN may be indicated in another manner.

Manner c

In Manner c, the first message includes an identifier of the first PLMN and/or an identifier of the first network slice.

The first message is the message 1, the message 3, or the message A.

Optionally, the first message is the message A, and the identifier of the first PLMN and/or the identifier of the first network slice are/is carried in data payload.

In Manner c, when the first message includes the identifier of the first PLMN, the first network slice may be indicated in another manner. When the first message includes the identifier of the first network slice, the first PLMN may be indicated in another manner.

Manner d

In Manner d, there are specifically the following three cases (denoted as a case (1), a case (2), and a case (3)) of indicating a PLMN and/or a network slice by using a PRACH resource.

Case (1)

In Case (1), the PLMN and the network slice are indicated by using the PRACH resource. In this case, optionally, during specific implementation, step 1401 includes the terminal sends the first message to the access network device by using a first PRACH resource, where the first PRACH resource corresponds to the first network slice that is in the first PLMN. Correspondingly, the access network device receives the first message from the terminal on the first PRACH resource.

In this embodiment of this application, when the PRACH resource corresponds to the PLMN and the network slice, one network slice in one PLMN corresponds to one PRACH resource. For example, if the cell supports two PLMNs a PLMN 1 and a PLMN 2, the PLMN 1 supports two network slices a network slice 1 and a network slice 2, and the PLMN 2 supports three network slices the network slice 1, network slice 2, and a network slice 3, for a PRACH resource corresponding to each network slice that is in each PLMN, refer to Table 15.

TABLE 15

| PLMN | Network slice | PRACH resource |
|---|---|---|
| PLMN 1 | Network slice 1 | 1 |
| | Network slice 2 | 2 |
| PLMN 2 | Network slice 1 | 3 |
| | Network slice 2 | 4 |
| | Network slice 3 | 5 |

In Case (1), the method further includes the access network device broadcasts system information, where the system information includes PRACH resources corresponding to network slices that are in a plurality of PLMNs. Correspondingly, the terminal receives, from the access network device, the system information broadcast by the access network device, and determines, based on the system information, the PRACH resources corresponding to the network slices that are in the plurality of PLMNs.

Case (2)

In Case (2), the network slice is indicated by using the PRACH resource. In this case, optionally, during specific implementation, step 1401 includes the terminal sends the first message to the access network device by using a second PRACH resource, where the second PRACH resource corresponds to the first network slice. Correspondingly, the access network device receives the first message from the terminal on the second PRACH resource.

When the PRACH resource corresponds to the network slice, one network slice corresponds to one PRACH resource. For example, if network slices supported by the cell are a network slice 1, a network slice 2, and a network slice 3, for a PRACH resource corresponding to each network slice, refer to Table 16.

TABLE 16

| Network slice | PRACH resource |
|---|---|
| Network slice 1 | 1 |
| Network slice 2 | 2 |
| Network slice 3 | 3 |

In Case (2), if the first message further indicates the first PLMN, the first PLMN may be indicated in another manner, for example, indicated in any one of the foregoing Manner a to Manner c.

Optionally, the method further includes the access network device broadcasts system information, where the system information includes PRACH resources corresponding to network slices that are in a communication system. Correspondingly, the terminal receives, from the access network device, the system information broadcast by the access network device, and determines, based on the system information, the PRACH resources corresponding to the network slices that are in the communication system.

Case (3)

In Case (3), the PLMN is indicated by using the PRACH resource. In this case, optionally, during specific implementation, step 1401 includes the terminal sends the first message to the access network device by using a third PRACH resource, where the third PRACH resource corresponds to the first PLMN. Correspondingly, the access network device receives the first message from the terminal on the third PRACH resource.

When the PRACH resource corresponds to the PLMN, one PLMN corresponds to one PRACH resource. For example, if the cell supports two PLMNs a PLMN 1 and a PLMN 2, for a PRACH resource corresponding to each PLMN, refer to Table 17.

TABLE 17

| PLMN | PRACH resource |
|---|---|
| PLMN 1 | 1 |
| PLMN 2 | 3 |

In Case (3), if the first message further indicates the first network slice, the first network slice may be indicated in another manner, for example, indicated in any one of the foregoing Manner a to Manner c.

In Case (3), optionally, the method further includes the access network device broadcasts system information, where the system information includes PRACH resources corresponding to a plurality of PLMNs. Correspondingly, the terminal receives, from the access network device, the system information broadcast by the access network device, where the system information includes the PRACH resources corresponding to the plurality of PLMNs. The terminal determines, based on the system information, the PRACH resources corresponding to the plurality of PLMNs.

In Manner d, the system information may be any piece of system information in existing system information, or may be any piece of system information in future evolved system information. This is not limited in this application.

In Manner d, the PRACH resource includes a time domain resource and a frequency domain resource that are of a PRACH. The time domain resource of the PRACH can be indicated by using a higher-layer parameter prach-ConfigurationIndex (prach-ConfigurationIndex) that can be obtained by querying Tables 6.3.3.2-2 to 6.3.3.2-4 in 3GPP TS 38.211, where prach-ConfigurationIndex may indicate information such as a PRACH format, a periodicity, a frame number in a periodicity, a subframe number, a start symbol, a PRACH slot, and a PRACH transmission opportunity in a slot. The frequency domain resource of the PRACH is determined by using a start resource block (resource block, RB), a quantity of used RBs, and a quantity of resource repetitions, where the start RB and the quantity of resource repetitions are determined by using a higher-layer parameter message 1-frequency start (msg1-FrequencyStart) and a message 1-frequency division multiplexing (frequency division multiplexing, FDM) (msg1-FDM), and the quantity of RBs is specified in Table 6.3.3.2-11 in 3GPP TS 38.211.

The foregoing mainly describes the solutions in embodiments of this application from a perspective of interaction between network elements. It may be understood that, to implement the foregoing functions, the network elements such as the CU, the DU, the terminal, and the access network device include corresponding hardware structures and/or software modules for performing the functions. A person skilled in the art should easily be aware that, in combination with the examples of units and algorithm steps described in embodiments disclosed in this specification, this application can be implemented by hardware or a combination form of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the CU, the DU, the terminal, and the access network device may be divided into functional units based on the foregoing method examples. For example, each functional unit may be obtained through division based on a corresponding function, or two or more functions may be integrated into one processing unit. The integrated unit may be implemented in a form of hardware, or may be implemented in a form of a software functional unit. It should be noted that, in embodiments of this application, division into the units is an example, and is merely logical function division. During actual implementation, another division manner may be used.

Figure 15:
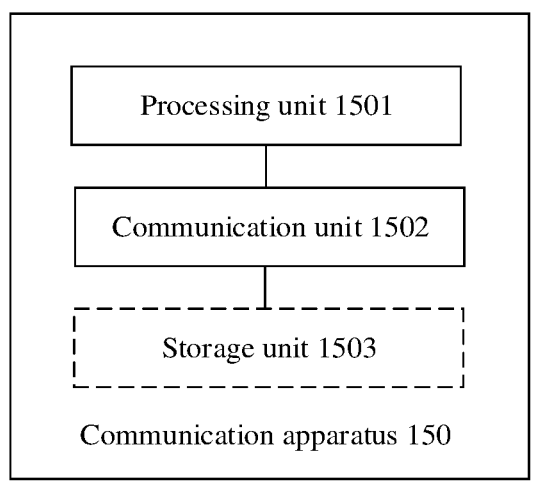
FIG. 15 is a schematic composition diagram of a communication apparatus according to an embodiment of this application.

When an integrated unit is used, FIG. 15 shows a communication apparatus 150 in embodiments. The communication apparatus 150 may include a processing unit 1501 and a communication unit 1502. Optionally, the communication apparatus 150 further includes a storage unit 1503. A schematic diagram of a structure shown in FIG. 15 may be used to show structures of the CU, the DU, the terminal, and the access network device in the foregoing embodiments.

When the schematic diagram of the structure shown in FIG. 15 is used to show the structure of the DU in the foregoing embodiments, the processing unit 1501 is configured to control and manage an action of the DU. For example, the processing unit 1501 is configured to support the DU in performing 801 and 802 in FIG. 8, 801, 802, (11), (12), (13*a*), and (14*a*) in FIG. 8A, 901 to 906, 908, and 909 in FIG. 9, and/or an action performed by the DU in another process described in embodiments of this application. The processing unit 1501 may communicate with another network entity via the communication unit 1502, for example, communicate with the CU shown in FIG. 8. The storage unit 1503 is configured to store program code and data that are of the DU.

When the schematic diagram of the structure shown in FIG. 15 is used to show the structure of the DU in the foregoing embodiments, the communication apparatus 150 may be a device, or may be a chip in a device.

When the schematic diagram of the structure shown in FIG. 15 is used to show the structure of the CU in the foregoing embodiments, the processing unit 1501 is configured to control and manage an action of the CU. For example, the processing unit 1501 is configured to support the CU in performing 802 and 803 in FIG. 8, 802, (12), (13*a*), (15*a*), and (13*b*) in FIG. 8A, 902, 903, and 906 to 910 in FIG. 9, and/or an action performed by the CU in another process described in embodiments of this application. The processing unit 1501 may communicate with another network entity via the communication unit 1502, for example, communicate with the DU shown in FIG. 8. The storage unit 1503 is configured to store program code and data that are of the CU.

When the schematic diagram of the structure shown in FIG. 15 is used to show the structure of the CU in the foregoing embodiments, the communication apparatus 150 may be a device, or may be a chip in a device.

When the schematic diagram of the structure shown in FIG. 15 is used to show the structure of the terminal in the foregoing embodiments, the processing unit 1501 is configured to control and manage an action of the terminal. For example, the processing unit 1501 is configured to support the terminal in performing 901, 904, 905, and 909 in FIG. 9, 1002 and 1003 in FIG. 10, 1101 to 1104 and 1108 in FIG. 11, (11) to (13) in FIG. 11A, (21) and (22) in FIG. 11B, steps in FIG. 12, steps in FIG. 13, 1401 and 1402 in FIG. 14, and/or an action performed by the terminal in another process described in embodiments of this application. The processing unit 1501 may communicate with another network entity via the communication unit 1502, for example, communicate with the access network device shown in FIG. 11. The storage unit 1503 is configured to store program code and data that are of the terminal.

When the schematic diagram of the structure shown in FIG. 15 is used to show the structure of the terminal in the foregoing embodiments, the communication apparatus 150 may be a device, or may be a chip in a device.

When the schematic diagram of the structure shown in FIG. 15 is used to show the structure of the access network device in the foregoing embodiments, the processing unit 1501 is configured to control and manage an action of the access network device. For example, the processing unit 1501 is configured to support the access network device in performing 1001 and 1002 in FIG. 10, 1101, 1104 to 1106, and 1108 in FIG. 11, 1401 and 1402 in FIG. 14, and/or an action performed by the access network device in another process described in embodiments of this application. The processing unit 1501 may communicate with another network entity via the communication unit 1502, for example, communicate with the terminal shown in FIG. 11. The storage unit 1503 is configured to store program code and data that are of the access network device.

When the schematic diagram of the structure shown in FIG. 15 is used to show the structure of the access network device in the foregoing embodiments, the communication apparatus 150 may be a device, or may be a chip in a device.

When an integrated unit in FIG. 15 is implemented in a form of a software functional module and sold or used as an independent product, the integrated unit may be stored in a computer-readable storage medium. Based on such an understanding, the technical solutions of embodiments of this application essentially, or the part contributing to a conventional technology, or all or a part of the technical solutions may be implemented in the form of a software product. The computer software product is stored in a storage medium and includes several instructions for instructing a computer device (which may be a personal computer, a server, a network device, or the like) or a processor to perform all or some of the steps of the methods described in embodiments of this application. The storage medium that stores the computer software product includes any medium that can store program code, such as a USB flash drive, a removable hard disk, a read-only memory (ROM), a random access memory (RAM), a magnetic disk, or an optical disc.

The units in FIG. 15 may also be referred to as modules. For example, the processing unit may be referred to as a processing module.

Figure 16:
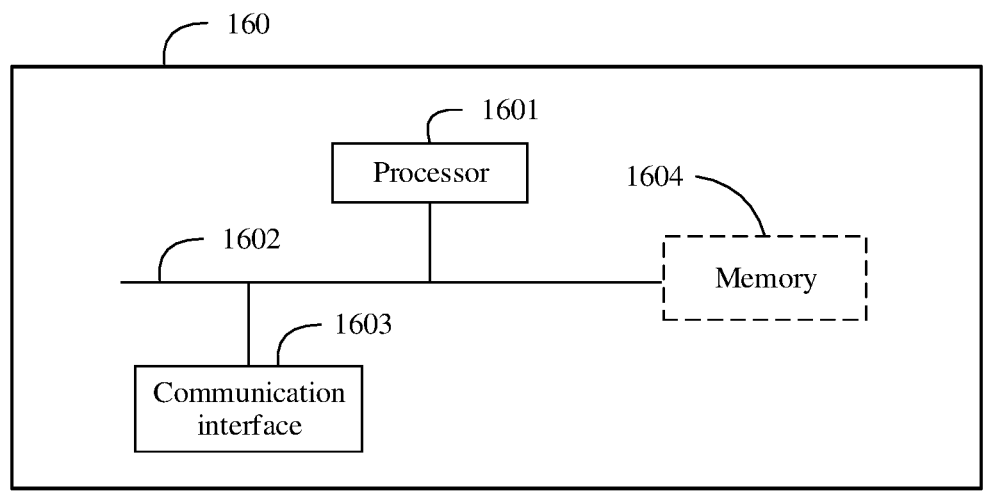
FIG. 16 is a schematic diagram of a hardware structure of a communication apparatus according to an embodiment of this application.

FIG. 16 is a schematic diagram of a hardware structure of a communication apparatus 160 according to an embodiment of this application. The communication apparatus 160 includes one or more processors 1601 and a communication interface 1603.

Optionally, the communication apparatus 160 further includes a memory 1604. The memory 1604 may include a read-only memory and a random access memory, and provide operation instructions and data for the processor 1601. A part of the memory 1604 may further include a nonvolatile random access memory (NVRAM).

In this embodiment of this application, the communication apparatus 160 invokes the operation instructions stored in the memory 1604 (where the operation instructions may be stored in an operating system), to perform corresponding operations.

The processor 1601 may also be referred to as a central processing unit (CPU).

The processor 1601, the communication interface 1603, and the memory 1604 are coupled together by using a bus system 1602. The bus system 1602 may further include a power bus, a control bus, a status signal bus, and the like in addition to a data bus. However, for clarity of description, various buses are marked as the bus system 1602 in FIG. 16.

The methods disclosed in the foregoing embodiments of this application may be applied to the processor 1601, or may be implemented by the processor 1601. The processor 1601 may be an integrated circuit chip with a signal processing capability. During implementation, the steps of the foregoing methods may be implemented by using an integrated logic circuit of hardware in the processor 1601, or by using software instructions. The processor 1601 may be a general-purpose processor, a digital signal processor (DSP), an application-specific integrated circuit (ASIC), a field-programmable gate array (FPGA) or another programmable logic device, a discrete gate or transistor logic device, or a discrete hardware component. The processor may implement or perform the methods, steps, and logical block diagrams that are disclosed in embodiments of this application. The general-purpose processor may be a microprocessor, or the processor may be any conventional processor or the like. The steps of the methods disclosed with reference to embodiments of this application may be directly performed and completed by a hardware decoding processor, or may be performed and completed by using a combination of hardware in a decoding processor and a software module. The software module may be located in a mature storage medium in the art, such as a random access memory, a flash memory, a read-only memory, a programmable read-only memory, an electrically erasable programmable memory, or a register. The storage medium is located in the memory 1604, and the processor 1601 reads information in the memory 1604 and completes the steps in the foregoing methods in combination with hardware of the processor 1601.

For example, the schematic diagram of the structure shown in FIG. 16 may be used to show structures of the CU, the DU, the terminal, and the access network device in the foregoing embodiments.

When the schematic diagram of the structure shown in FIG. 16 is used to show the structure of the DU in the foregoing embodiments, the processor 1601 is configured to control and manage an action of the DU. For example, the processor 1601 is configured to support the DU in performing 801 and 802 in FIG. 8, 801, 802, (11), (12), (13*a*), and (14*a*) in FIG. 8A, 901 to 906, 908, and 909 in FIG. 9, and/or an action performed by the DU in another process described in embodiments of this application. The processor 1601 may communicate with another network entity via the communication interface 1603, for example, communicate with the CU shown in FIG. 8. The memory 1604 is configured to store program code and data that are of the DU.

When the schematic diagram of the structure shown in FIG. 16 is used to show the structure of the CU in the foregoing embodiments, the processor 1601 is configured to control and manage an action of the CU. For example, the processor 1601 is configured to support the CU in performing 802 and 803 in FIG. 8, 802, (12), (13*a*), (15*a*), and (13*b*) in FIG. 8A, 902, 903, and 906 to 910 in FIG. 9, and/or an action performed by the CU in another process described in embodiments of this application. The processor 1601 may communicate with another network entity via the communication interface 1603, for example, communicate with the DU shown in FIG. 8. The memory 1604 is configured to store program code and data that are of the CU.

When the schematic diagram of the structure shown in FIG. 16 is used to show the structure of the terminal in the foregoing embodiments, the processor 1601 is configured to control and manage an action of the terminal. For example, the processor 1601 is configured to support the terminal in performing 901, 904, 905, and 909 in FIG. 9, 1002 and 1003 in FIG. 10, 1101 to 1104 and 1108 in FIG. 11, (11) to (13) in FIG. 11A, (21) and (22) in FIG. 11B, steps in FIG. 12, steps in FIG. 13, 1401 and 1402 in FIG. 14, and/or an action performed by the terminal in another process described in embodiments of this application. The processor 1601 may communicate with another network entity via the communication interface 1603, for example, communicate with the access network device shown in FIG. 11. The memory 1604 is configured to store program code and data that are of the terminal.

When the schematic diagram of the structure shown in FIG. 16 is used to show the structure of the access network device in the foregoing embodiments, the processor 1601 is configured to control and manage an action of the access network device. For example, the processor 1601 is configured to support the access network device in performing 1001 and 1002 in FIG. 10, 1101, 1104 to 1106, and 1108 in FIG. 11, 1401 and 1402 in FIG. 14, and/or an action performed by the access network device in another process described in embodiments of this application. The processor 1601 may communicate with another network entity via the communication interface 1603, for example, communicate with the terminal shown in FIG. 11. The memory 1604 is configured to store program code and data that are of the access network device.

The foregoing communication unit or communication interface may be an interface circuit or a communication interface in the apparatus for receiving a signal from another apparatus. For example, when the apparatus is implemented as a chip, the communication unit or communication interface is an interface circuit or a communication interface in the chip for receiving a signal from or sending a signal to another chip or apparatus.

In embodiments, the instructions that are stored in the memory and that are to be executed by the processor may be implemented in a form of a computer program product. The computer program product may be written into the memory in advance, or may be downloaded and installed in the memory in a form of software.

The computer program product includes one or more computer instructions. When the computer program instructions are loaded and executed on a computer, the procedures or the functions according to embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid-state drive (SSD)), or the like.

Optionally, an embodiment of this application further provides a computer-readable storage medium. The computer-readable storage medium stores computer instructions. When the computer-readable storage medium is run on a computer, the computer is enabled to perform the communication methods provided in embodiments of this application.

An embodiment of this application further provides a computer program product that includes computer instructions. When the computer program product runs on a computer, the computer is enabled to perform the communication methods provided in embodiments of this application.

An embodiment of this application further provides a chip. The chip includes a processor. When the processor executes instructions, the chip is enabled to perform the communication method provided in embodiments of this application.

All or some of foregoing embodiments may be implemented by using software, hardware, firmware, or any combination thereof. When a software program is used to implement embodiments, all or some of embodiments may be implemented in a form of a computer program product. The computer program product includes one or more computer instructions. When the computer program instructions are loaded and executed on a computer, the procedures or the functions according to embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, an SSD), or the like.

Although this application is described with reference to embodiments, in a process of implementing this application that claims protection, a person skilled in the art may understand and implement another variation of the disclosed embodiments by viewing the accompanying drawings, disclosed content, and the appended claims. In the claims, "comprising" (comprising) does not exclude another component or another step, and "a" or "one" does not exclude a case of "a plurality of". A single processor or another unit may implement several functions enumerated in the claims. Some measures are recorded in dependent claims that are different from each other, but this does not mean that the measures cannot be combined to produce a good effect.

Although this application is described with reference to specific features and embodiments thereof, it is clear that various modifications and combinations may be made to them without departing from the spirit and scope of this application. Correspondingly, the specification and accompanying drawings are merely example descriptions of this application defined by the appended claims, and are considered as any of and all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of the claims of this application and their equivalent technologies.

What is claimed is:

1. A communication method, comprising:
  obtaining, by a distributed unit (DU), resource occupation information of network slices that are in at least two public land mobile networks (PLMNs) supported by a cell of the DU, wherein the network slices in the at least two PLMNs share a resource;
  sending, by the DU, the resource occupation information to a centralized unit (CU);
  receiving, by the DU, request information from a terminal, wherein the request information comprises an identifier of a first PLMN and an identifier of a first network slice, and wherein the request information is used by the terminal to request to access the first network slice that is in the first PLMN;
  sending, by the DU, the request information to the CU;
  receiving, by the DU, release information from the CU, wherein the release information indicates to the terminal to release a radio resource control (RRC) connection to the CU; and
  sending, by the DU, the release information to the terminal.

2. The method according to claim 1, wherein the release information comprises a release cause, and wherein the release cause indicates that a resource of the first network slice in the first PLMN is insufficient.

3. The method according to claim 1, wherein the release information is carried in a downlink RRC message transfer message.

4. The method according to claim 1, wherein the resource occupation information is used by the CU to determine whether the terminal is allowed to access the first network slice that is in the first PLMN.

5. A communication method, comprising:
  receiving, by a centralized unit (CU) from a distributed unit (DU), resource occupation information of network slices that are in at least two public land mobile networks (PLMNs) supported by a cell of the DU, wherein the network slices in the at least two PLMNs share a resource;
  using, by the CU, the resource occupation information; and
  receiving, by the CU, request information from the DU, wherein the request information comprises an identifier of a first PLMN of the at least two PLMNs and an identifier of a first network slice, and wherein the request information is used by a terminal to request to access the first network slice that is in the first PLMN;
  wherein the using, by the CU, the resource occupation information comprises:
    sending, by the CU, release information to the DU in response to the CU determining, based on the resource occupation information, that the terminal is not allowed to access the first network slice that is in the first PLMN, and further in response to the terminal having established a radio resource control (RRC) connection to the CU, wherein the release information is used to indicate the terminal to release the RRC connection to the CU.

6. The method according to claim 5, wherein the sending, by the CU, the release information to the DU comprises:
sending, by the CU, the release information to the DU in response to the CU determining, based on the resource occupation information, that a resource occupation rate of the first network slice in the first PLMN is greater than or equal to a threshold, and further in response to the terminal having established the RRC connection to the CU.

7. The method according to claim 6, wherein the release information is carried in a downlink RRC message transfer message.

8. The method according to claim 5, wherein the sending the release information to the DU comprises:
sending, by the CU, the release information to the DU in response to the CU determining, based on the resource occupation information, that the first network slice in the first PLMN is not a first network slice with a lowest resource occupation rate in first network slices that are in the at least two PLMNs, and further in response to the terminal establishing the RRC connection to the CU.

9. The method according to claim 5, wherein the sending the release information to the DU comprises:
sending, by the CU, the release information to the DU in response to the CU determining, based on the resource occupation information, that a resource of the first network slice in the first PLMN is overloaded, and further in response to the terminal having established the RRC connection to the CU.

10. The method according to claim 5, wherein the release information comprises a release cause, and wherein the release cause indicates that a resource of the first network slice in the first PLMN is insufficient.

11. The method according to claim 5, further comprising:
sending, by the CU to an access and mobility management function (AMF) in the first PLMN, a cause for rejecting access of the terminal, wherein the cause indicates that the resource of the first network slice in the first PLMN is insufficient.

12. A communication apparatus, comprising:
at least one processor; and
one or more non-transitory memories coupled to the at least one processor and storing program instructions for execution by the at least one processor, the program instructions including instructions for:
receiving, from a distributed unit (DU), resource occupation information of network slices that are in at least two public land mobile networks (PLMNs) supported by a cell of the DU, wherein the network slices in the at least two PLMNs share a resource;
using the resource occupation information; and
receiving request information from the DU, wherein the request information comprises an identifier of a first PLMN of the at least two PLMNs and an identifier of a first network slice of the network slices, and wherein the request information is used by a terminal to request to access the first network slice that is in the first PLMN; and
wherein the using the resource occupation information comprises:
sending release information to the DU in response to determining, based on the resource occupation information, that the terminal is not allowed to access the first network slice that is in the first PLMN, and further in response to the terminal establishing a radio resource control (RRC) connection to a centralized unit (CU), wherein the release information indicates to the terminal to release the RRC connection to the CU.

13. The communication apparatus according to claim 12, wherein the instructions for sending the release information to the DU include instructions for:
sending, the release information to the DU in response to the CU determining, based on the resource occupation information, that a resource occupation rate of the first network slice in the first PLMN is greater than or equal to a threshold, and further in response to the terminal establishes the RRC connection to the CU.

14. The communication apparatus according to claim 13, wherein the release information is carried in a downlink RRC message transfer message.

15. The communication apparatus according to claim 12, wherein the instructions for sending the release information to the DU comprise instructions for:
sending the release information to the DU in response to the CU determining, based on the resource occupation information, that the first network slice in the first PLMN is not a first network slice with a lowest resource occupation rate in first network slices that are in the at least two PLMNs, and further in response to the terminal having established the RRC connection to the CU.

16. The communication apparatus according to claim 12, wherein the instructions for sending the release information to the DU comprise instructions for:
sending the release information to the DU in response to the CU determining, based on the resource occupation information, that a resource of the first network slice in the first PLMN is overloaded, and further in response to the terminal having established the RRC connection to the CU.

17. The communication apparatus according to claim 12, wherein the release information comprises a release cause, and wherein the release cause indicates that a resource of the first network slice in the first PLMN is insufficient.

18. The communication apparatus according to claim 12, wherein the instructions include instructions for:
sending to an access and mobility management function (AMF) in the first PLMN, a cause for rejecting access of the terminal, wherein the cause indicates that the resource of the first network slice in the first PLMN is insufficient.

* * * * *